United States Patent
Levy et al.

(10) Patent No.: US 10,789,080 B2
(45) Date of Patent: Sep. 29, 2020

(54) MULTI-TIER CUSTOMIZABLE PORTAL DEPLOYMENT SYSTEM

(71) Applicant: Microsoft Technology Licensing, LLC, Redmond, WA (US)

(72) Inventors: Bianca Blount Levy, Sterling, VA (US); Riccardo Terrell, Oxon Hill, MD (US); Jonathan Claude Baker, The Plains, VA (US); Nancy Fung, Sterling, VA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 613 days.

(21) Appl. No.: 14/802,364

(22) Filed: Jul. 17, 2015

(65) Prior Publication Data

US 2017/0017503 A1    Jan. 19, 2017

(51) Int. Cl.
*G06F 9/451* (2018.01)
*G06F 3/0483* (2013.01)
(Continued)

(52) U.S. Cl.
CPC ............ *G06F 9/454* (2018.02); *G06F 3/0483* (2013.01); *G06F 3/04842* (2013.01); *G06F 16/958* (2019.01); *G06F 40/58* (2020.01)

(58) Field of Classification Search
CPC ............ G06F 17/30905; G06F 3/0483; G06F 3/04842; G06F 9/4448; G06F 17/3089; G06F 17/30867; G06F 3/0482; G06F 17/289; G06F 17/2854; G06F 17/30575; G06F 17/30699; G06F 21/604;
(Continued)

(56) References Cited

U.S. PATENT DOCUMENTS 5,001,628 A * 3/1991 Johnson .................. H04L 29/00
5,075,850 A * 12/1991 Asahioka ............ G06F 17/2735
704/10

(Continued)

OTHER PUBLICATIONS

International Preliminary Report on Patentability for International Patent Application No. PCT/US2016/042378, dated Aug. 23, 2017, date of filing: Jul. 15, 2016, 7 pages.

(Continued)

*Primary Examiner* — Renee D Chavez
*Assistant Examiner* — Carl P Lobo
(74) *Attorney, Agent, or Firm* — Christopher J. Volkmann; Kelly, Holt & Christenson, PLLC

(57) ABSTRACT

A computing system comprises, in one example, a display system, a portal hierarchy model have a plurality of nodes arranged in hierarchical parent/child relationships, each node representing a set of one or more portals and having associated portal configuration data, and a portal rendering system configured to detect a user request to render content in a given one of the portals and to obtain a set of portal configuration data for the given portal by identifying a first node in the portal hierarchy model that represents the given portal and traversing the portal hierarchy model from the first node to a second node that is a parent of the first node. The computing system also includes a display system controller configured to control the display system to generate portal user interface displays based on the set of portal configuration data.

19 Claims, 16 Drawing Sheets

(51) Int. Cl.
  *G06F 3/0484* (2013.01)
  *G06F 16/958* (2019.01)
  *G06F 40/58* (2020.01)

(58) Field of Classification Search
  CPC .... G06F 21/6218; G06F 3/0484; G06F 9/454; G06F 8/38; G06F 17/211; G06F 17/2247; G06F 2203/04803; G06F 3/048; G06F 9/451; G06F 11/0709; G06F 19/00; G06F 9/5077; G06F 16/958; G06F 16/95; G06F 16/951; G06F 16/954; G06F 16/212; G06F 16/2228; G06F 16/81; G06F 17/227; G06F 16/972; G06F 17/212; G06F 17/218; G06F 2221/2145; G06F 3/04817; G06F 3/0488; G06F 16/9027; G06F 16/904; G06F 16/955; G06F 16/986; G06F 16/282; G06F 16/287; G06F 16/83; G06F 3/017; G06Q 10/06; G06Q 10/101; G06Q 10/103; H04L 63/102
  See application file for complete search history.

(56) References Cited

U.S. PATENT DOCUMENTS

| | | | | |
|---|---|---|---|---|
| 5,966,685 A * | 10/1999 | Flanagan | G06F 17/2827 | 379/88.05 |
| 6,519,571 B1 * | 2/2003 | Guheen | G06Q 30/02 | 705/14.66 |
| 6,633,943 B1 * | 10/2003 | James | H04L 12/40058 | 370/258 |
| 6,982,708 B1 * | 1/2006 | Mah | G06F 17/30905 | 345/418 |
| 7,110,938 B1 | 9/2006 | Cheng et al. | | |
| 7,149,960 B1 * | 12/2006 | Brooks | G06F 21/6218 | 715/234 |
| 7,246,263 B2 * | 7/2007 | Skingle | H04L 63/029 | 709/200 |
| 7,412,374 B1 * | 8/2008 | Seiler | G06F 17/275 | 704/7 |
| 7,469,255 B2 * | 12/2008 | Kusterer | G06F 16/9027 | |
| 7,472,170 B2 * | 12/2008 | Zak | H04L 29/12009 | 709/218 |
| 7,490,290 B2 * | 2/2009 | White | G06F 17/2247 | 715/236 |
| 7,624,160 B2 * | 11/2009 | Henderson | G06F 17/30902 | 709/217 |
| 7,676,557 B1 * | 3/2010 | Behl | G06F 9/451 | 709/220 |
| 7,698,655 B2 * | 4/2010 | Bales | G06F 17/3089 | 715/708 |
| 7,774,378 B2 * | 8/2010 | Nelson | G06F 17/3089 | 707/803 |
| 7,802,182 B2 * | 9/2010 | Bales | G06F 17/212 | 715/200 |
| 7,840,707 B2 * | 11/2010 | Jerrard-Dunne | H04L 67/28 | 709/246 |
| 7,890,639 B1 * | 2/2011 | Holmstead | G06F 21/6218 | 709/229 |
| 7,890,877 B2 * | 2/2011 | Ritchy | G06F 17/3089 | 715/736 |
| 7,987,421 B1 * | 7/2011 | Timothy | G06F 16/954 | 715/243 |
| 8,032,634 B1 * | 10/2011 | Eppstein | H04L 67/34 | 709/226 |
| 8,055,705 B2 * | 11/2011 | Ng | G06F 16/957 | 709/203 |
| 8,150,736 B2 | 4/2012 | Horn et al. | | |
| 8,364,640 B1 * | 1/2013 | Beatty | G06F 11/1469 | 707/640 |
| 8,386,235 B2 | 2/2013 | Duan | | |
| 8,959,423 B2 * | 2/2015 | Hammoud | G06F 3/04812 | 715/205 |
| 9,268,870 B2 * | 2/2016 | Shikari | G06F 8/36 | |
| 9,269,117 B2 * | 2/2016 | Pocklington | G06Q 10/10 | |
| 9,524,503 B2 * | 12/2016 | Lee | G06Q 30/02 | |
| 9,767,095 B2 * | 9/2017 | Tregaskis | G06F 17/2836 | |
| 10,110,442 B2 * | 10/2018 | Filatov | G06F 3/0481 | |
| 2001/0028369 A1 * | 10/2001 | Gallo | G06F 3/04815 | 715/848 |
| 2001/0029455 A1 * | 10/2001 | Chin | G06F 17/273 | 704/277 |
| 2002/0002452 A1 * | 1/2002 | Christy | G06F 17/2872 | 704/3 |
| 2002/0066033 A1 * | 5/2002 | Dobbins | G06Q 30/0277 | 726/4 |
| 2002/0129130 A1 * | 9/2002 | Azuma | H04L 29/06 | 709/220 |
| 2002/0194267 A1 * | 12/2002 | Flesner | G06F 9/451 | 709/203 |
| 2003/0009564 A1 * | 1/2003 | Eckel | G06F 16/954 | 709/227 |
| 2004/0123296 A1 * | 6/2004 | Challenger | G06F 9/5027 | 718/102 |
| 2004/0183831 A1 * | 9/2004 | Ritchy | G06F 16/958 | 715/762 |
| 2004/0199392 A1 * | 10/2004 | Khatri | G06F 17/211 | 704/277 |
| 2004/0205473 A1 * | 10/2004 | Fisher | G06F 21/41 | 715/255 |
| 2004/0230947 A1 * | 11/2004 | Bales | G06F 16/954 | 717/110 |
| 2005/0050173 A1 * | 3/2005 | Kikuchi | G06F 16/9535 | 709/219 |
| 2005/0065913 A1 * | 3/2005 | Lillie | G06F 17/30873 | |
| 2005/0149549 A1 * | 7/2005 | Jaspers | G06F 17/3089 | |
| 2005/0188078 A1 * | 8/2005 | Kotzin | H04N 7/163 | 709/224 |
| 2005/0228880 A1 * | 10/2005 | Champlin | G06F 11/3447 | 709/224 |
| 2005/0251550 A1 * | 11/2005 | Chiodo | G06F 21/6218 | 709/203 |
| 2005/0256906 A1 * | 11/2005 | Bales | G06F 16/958 | |
| 2005/0267789 A1 * | 12/2005 | Satyadas | G06Q 10/06 | 705/7.12 |
| 2006/0026213 A1 * | 2/2006 | Yaskin | G09B 7/02 | |
| 2006/0036954 A1 * | 2/2006 | Satyadas | G06Q 10/06 | 715/742 |
| 2006/0069714 A1 * | 3/2006 | Blount | G06Q 10/10 | 709/203 |
| 2006/0069920 A1 * | 3/2006 | Jolley | H04L 63/102 | 713/182 |
| 2006/0074942 A1 * | 4/2006 | Shaburov | G06F 17/30306 | |
| 2006/0095676 A1 * | 5/2006 | Dzierzon | G06F 17/30873 | 711/133 |
| 2006/0174187 A1 * | 8/2006 | White | G06F 17/2247 | 715/235 |
| 2006/0195816 A1 * | 8/2006 | Grandcolas | G06Q 40/02 | 717/101 |
| 2006/0241992 A1 * | 10/2006 | Yaskin | G06Q 10/06 | 705/7.36 |
| 2006/0294495 A1 * | 12/2006 | Smith | G06F 16/958 | 717/105 |
| 2007/0067062 A1 * | 3/2007 | Mairs | G09B 25/04 | 700/275 |
| 2007/0075136 A1 * | 4/2007 | Jacob | G06Q 10/02 | 235/383 |
| 2007/0094595 A1 * | 4/2007 | Heck | G06Q 10/06 | 715/700 |
| 2007/0101297 A1 * | 5/2007 | Forstall | G06F 3/04817 | 715/841 |
| 2007/0112890 A1 * | 5/2007 | Murase | G06F 16/93 | |
| 2007/0125860 A1 * | 6/2007 | Lapstun | G06F 3/03545 | 235/462.01 |
| 2007/0130010 A1 * | 6/2007 | Pokonosky | G06Q 30/02 | 705/14.64 |

(56) References Cited

U.S. PATENT DOCUMENTS

| | | | |
|---|---|---|---|
| 2007/0136788 A1* | 6/2007 | Monahan | H04L 63/20 726/3 |
| 2007/0157172 A1* | 7/2007 | Zenz | G06F 9/44505 717/121 |
| 2007/0157185 A1* | 7/2007 | Semerdzhiev | G06F 8/61 717/148 |
| 2007/0239726 A1* | 10/2007 | Weiss | G06Q 10/10 |
| 2007/0271517 A1* | 11/2007 | Finkelman | G06F 17/30864 715/742 |
| 2008/0065679 A1* | 3/2008 | Fish | G06F 17/30905 |
| 2008/0088886 A1* | 4/2008 | Silverbrook | G06Q 30/02 358/403 |
| 2008/0120129 A1* | 5/2008 | Seubert | G06Q 10/06 705/35 |
| 2008/0120593 A1* | 5/2008 | Keren | G06F 9/451 717/105 |
| 2008/0263138 A1* | 10/2008 | Heslep | G06Q 10/10 709/203 |
| 2009/0006987 A1* | 1/2009 | Simhi | G06F 8/24 715/762 |
| 2009/0024552 A1* | 1/2009 | Klein | G06N 5/025 706/47 |
| 2009/0106234 A1* | 4/2009 | Siedlecki | G06Q 30/0276 |
| 2010/0161344 A1* | 6/2010 | Dyson | G06F 17/30389 705/1.1 |
| 2010/0192054 A1* | 7/2010 | Nauerz | G06F 17/241 715/234 |
| 2010/0329574 A1* | 12/2010 | Moraleda | G06F 17/30011 382/217 |
| 2011/0090833 A1* | 4/2011 | Kneckt | H04L 12/1854 370/312 |
| 2011/0131178 A1* | 6/2011 | Kanellos | G06F 16/83 707/609 |
| 2011/0213789 A1* | 9/2011 | Doshi | G06F 21/6218 707/754 |
| 2012/0195325 A1* | 8/2012 | Connelly | H04L 51/14 370/432 |
| 2013/0086694 A1* | 4/2013 | Agrawal | G06F 9/468 726/28 |
| 2013/0227112 A1* | 8/2013 | Lehmann | G06F 16/9574 709/224 |
| 2013/0246908 A1* | 9/2013 | Buehler | G06F 16/958 715/234 |
| 2013/0304616 A1* | 11/2013 | Raleigh | G06Q 20/145 705/34 |
| 2014/0081618 A1 | 3/2014 | Kim | |
| 2014/0173199 A1* | 6/2014 | Gupta | G06F 17/30221 711/117 |
| 2014/0278342 A1 | 9/2014 | Shoshan et al. | |
| 2014/0282854 A1* | 9/2014 | Clark | H04L 63/20 726/1 |
| 2015/0006345 A1* | 1/2015 | Amancherla | G06Q 20/027 705/35 |
| 2015/0058465 A1* | 2/2015 | Buehler | G06F 16/958 709/223 |
| 2015/0347611 A1* | 12/2015 | Holt | H04L 67/02 715/234 |
| 2016/0154913 A1* | 6/2016 | Altare | G06Q 10/06 703/13 |
| 2016/0344772 A1* | 11/2016 | Monahan | G06F 21/577 |
| 2017/0004205 A1* | 1/2017 | Jain | G06F 16/93 |
| 2018/0081905 A1* | 3/2018 | Kamath | G06F 3/0601 |

OTHER PUBLICATIONS

International Search Report and Written Opinion for International Patent Application No. PCT/US2016/042378, dated Sep. 28, 2016, date of filing: Jul. 15, 2016, 12 pages.

Anonymous: "Working with Subportals", Mar. 1, 2015, Retrieved from the Internet: URL:http://web.archive.org/web/20150301144601/http://docs.oracle.com/cd/E29542_01/doc.1111/e27603/portadv_sub.htm#WCPAA2898, 14 pages.

Second Written Opinion for International Patent Application No. PCT/US2016/042378, dated May 31, 2017, date of filing: Jul. 16, 2016, 6 pages.

"Oracle:Translating Portals Into Other Languages", Published on: Oct. 18, 2013, Available at: http://docs.oracle.com/cd/E29542_01/doc.1111/e27603/xlate.htm#WCPAA2437.

"Oracle-Configuring Global Display Across Portal", Published on: Jun. 4, 2014, Available at: http://docs.oracle.com/cd/E29542_01/webcenter.1111/e27738/wcadm_ps_global.htm#WCADM11242.

"Aeries Automated Internet Registration—Configure Settings", Published on: Apr. 1, 2015, Available at: http://help.aeries.com/help/Aeries_Automated_Internet_Registration_-_Configure_Settings.

Young, Anton De. "Configuring your Zendesk to support multiple languages (Plus and Enterprise)", Published on: Jan. 18, 2012 Available at: https://support.zendesk.com/hc/en-us/articles/203663376-Configuring-your-Zendesk-to-support-multiple-languages-Plus-and-Enterprise-.

"DeskPRO Administration Language", Retrieved on: May 13, 2015, Available at: https://manuals.deskpro.com/html/admin/localization/laguages.html.

"Salesforce Customer Portal Implementation Guide", Retrieved on: May 13, 2015, Avaliable at: https://login.salesforce.com/help/pdfs/en/salesforce_customer_portal_implementation_guide.pdf.

"Create a multi-Language Website", Retrieved on: May 13. 2015, Available at: https://support.office.com/en-us/article/Create-a-multi-language-website-da0b5614-8cf5-4905-a44c-90c2b3f8fbb6.

"Multisite Manager", Published on: Apr. 14, 2012, Available at: http://wem.help.adobe.com/enterprise/en_US/10-0/wem/administering/multi_site_manager.html.

Miner, Todd, "Apptivo", Published on:Dec. 19, 2012, Available at: http://www.apptivo.com/blog/apptivos-plans-for-supporting-multiple-languages-localization/.

"Integration with Google Translate—Customer Portal _ Freshdesk", Published on: May 2, 2015, Available at: https://support.freshdesk.com/support/solutions/articles/205248-integration-with-google-translate-customer-portal.

"Setup Multilingual Support in the Unified Portal", Published on: Mar. 30, 2015 Avaliable at: htps://support.parature.com/ics/support/kbAnswer.asp?questionID=6453.

* cited by examiner

MULTI-TIER CUSTOMIZABLE PORTAL DEPLOYMENT SYSTEM

BACKGROUND

Computing systems are currently in wide use. As one example, a computing system is used to provide access to content through portals. User interface displays, such as portal pages, facilitate user access to the content in any of a variety of ways. In one example, portals are used by an organization to provide customer service functionality to their customers who access a portal provided via a website managed by the organization. For instance, the website can be accessed by a user through a web browser on a user client device.

In order to provide a more narrowly tailored user content access experience, the portal content is often segregated along organization-defined lines. For example, a portal may be specific to a particular product, department, brand, subject matter area, etc. Thus, each portal may be managed by different groups of organizational agents and provide different types of content in different formats.

The discussion above is merely provided for general background information and is not intended to be used as an aid in determining the scope of the claimed subject matter.

SUMMARY

A computing system comprises, in one example, a display system, a portal hierarchy model have a plurality of nodes arranged in hierarchical parent/child relationships, each node representing a set of one or more portals and having associated portal configuration data, and a portal rendering system configured to detect a user request to render content in a given one of the portals and to obtain a set of portal configuration data for the given portal by identifying a first node in the portal hierarchy model that represents the given portal and traversing the portal hierarchy model from the first node to a second node that is a parent of the first node. The computing system also includes a display system controller configured to control the display system to generate portal user interface displays based on the set of portal configuration data.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter. The claimed subject matter is not limited to implementations that solve any or all disadvantages noted in the background.

DETAILED DESCRIPTION

Figure 1:
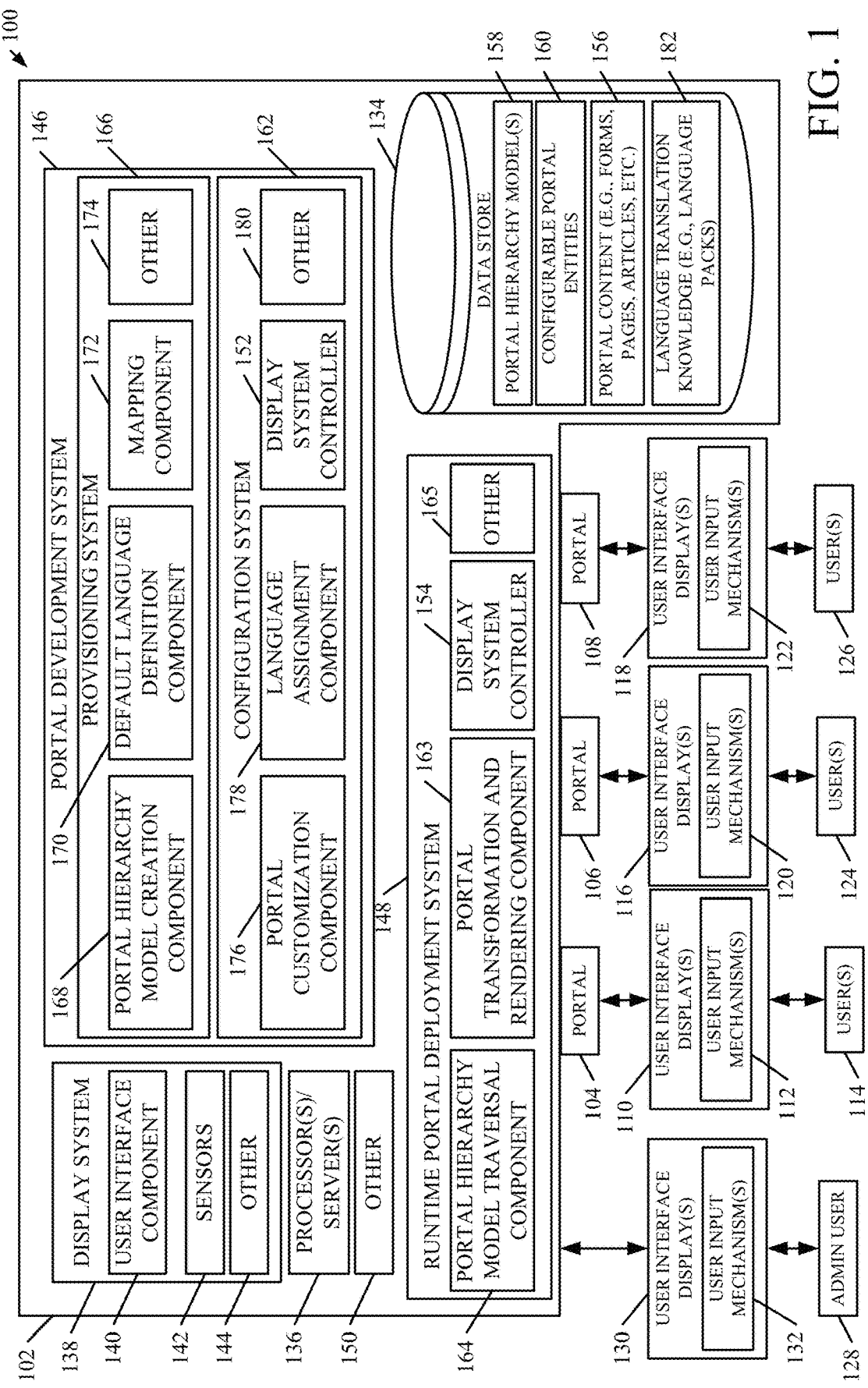
FIG. 1 is a block diagram of one example of a portal development and deployment architecture.

FIG. 1 is a block diagram of one example of a portal development and deployment architecture 100. Architecture 100 includes a computing system 102 that provides a plurality of portals that are accessible by users through user interface displays. In the illustrated example, architecture 100 includes a first portal 104, a second portal 106, and a third portal 108. However, any number of portals can be utilized. For example, the number of portals can depend on the type and diversity (e.g., various subject matter areas) of content to be provided to the organization's customers or other users.

Portal 104 is shown as having user interface displays 110 with user input mechanisms 112 for interaction by one or more users 114 of an organization. Similarly, portals 106 and 108 include, respectively, user interface displays 116 and 118 with user input mechanisms 120 and 122 for interaction by users 124 and 126. Users 114, 124, and 126 illustratively interact with the respective user input mechanisms in order to control and manipulate various parts of architecture 100. It is understood that any number of users can interact with portals 104, 106, and 108.

FIG. 1 also illustrates that an administrator user (or administrator) 128 can also access architecture 100 through user interface displays 130 having user input mechanisms 132. For example, administrator 128 is a user of an organization who utilizes architecture 100 to configure portals 104, 106, and 108 in any desired way.

Each of users 114, 124, 126, and 128 can access components of architecture 100 locally and/or remotely. In one example, one or more of users 114, 124, 126, and 128 use a respective client device that communicates with architecture 100 over a wide area network, such as the Internet.

Users 114, 124, 126, and 128 interact with the user input mechanisms to control and manipulate architecture 100. For instance, users 114, 124, 126, and 128 can access data in a data store 134. User data access can include, but is not limited to, read access, write access, and/or update access to the data. Updating data can include modifying and/or deleting data in data store 134.

The user input mechanisms sense physical activities, for example by generating user interface displays that are used to sense user interaction with architecture 100. The user interface displays can include user input mechanisms that sense user inputs in a wide variety of different ways, such as point and click devices (e.g., a computer mouse or track ball), a keyboard (either virtual or hardware), a keypad, where the display device used to display the user interface displays is a touch sensitive display, the inputs can be provided as touch gestures. Similarly, the user inputs can illustratively be provided by voice inputs or other natural user interface input mechanisms as well.

Before discussing architecture 100 in further detail, it is noted that FIG. 1 shows a variety of different functional blocks. It will be noted that the blocks can be consolidated so that more functionality is performed by each block, or they can be divided so that the functionality is further distributed. It should also be noted that the above discussion has shown one or more data stores, including data store 134. Data store 134 can be any of a wide variety of different types. Further, the data in the data stores can consolidated into a same data store, and can be stored in multiple additional data stores as well. Also, the data stores can be local to the environments, agents, modules, and/or components that access them, or they can be remote therefrom and accessible by those environments, agents, modules, and/or components. Similarly, some can be local while others are remote.

In the example shown in FIG. 1, computing system 102 includes processor(s) and/or server(s) 136, a display system 138 (which, itself, includes a user interface component 140 and one or more sensors 142, and it can include other items 144 as well), a portal development system 146, and a runtime portal deployment system 148. Computing system 102 can include other items 150 as well.

Sensor(s) 142 are configured to detect inputs to display system 138. In one example, one or more of portal development system 146 and runtime portal deployment system 148 also include sensors configured to detect inputs to those systems as well.

In the example of FIG. 1, system 148 also includes a portal transformation and rendering component 163, a portal hierarchy model traversal component 164, and can include other items 165 as well.

While systems 138, 146, and 148 are illustrated in FIG. 1 as separate blocks, it is noted that some or all components of the systems can be consolidated into a single component.

In one example, processor(s) and/or server(s) 136 comprises a computer processor with associated memory and timing circuitry (not shown). The computer processor is a functional part of system 102 and is activated by, and facilitates the functionality of, other systems, components and items in computing system 102.

As illustrated in FIG. 1, user interface component 140 is used by parts of system 102 to generate user interface displays for users 114, 124, 126, and 128. For example, portal development system 146 includes a display system controller 152 and system 148 includes a display system controller 154. Display system controllers 152 and 154 are configured to control display system 138 to generate various user interface displays with user input mechanisms that receive user inputs.

As shown in FIG. 1, data store 134 stores portal content 156 to be rendered to users through portals 104, 106, and 108. Portal content 156 can be any of a wide variety of different types of content. For example, but not by limitation, architecture 100 is deployed in a customer service environment to provide customer service content to users 114, 124, and 126. In this example, portal content 156 can include, but is not limited to, forms, pages, articles, documents and/or messages that can provide help content, how-to guides, knowledge base content, etc. In one particular example, user 114 logs into or otherwise accesses portal 104 and is presented with a customer service form for the user to fill out to initiate a customer service dialog with a customer service representative (CSR). The form may require the user to input various types of information, such as, but not limited to, user identification information, product information, and a description of an issue for which the user requires assistance from the CSR. This, of course, is by way of example only.

Each portal comprises user interface displays that bring together information from one or more sources. In one example, each portal is directed to a different subject matter area and provide different content from each other. For instance, a portal can belong to or otherwise be associated with a particular organizational group, such as a department or other business unit that has a particular taxonomy to refer to various products and other artifacts.

As such, the portals can be defined in any of a number of ways. For example, the portals can be defined in a manner based on how the organization desires to divide up the content that is available and accessed by its end users. Portals, for example, can be defined along product lines, with each portal being specific to a given product or product category. As such, the branding of each portal can be specific to that product or product category. In this example, the portal can provide content from sources that belong or are otherwise associated with that organizational group. In this manner, portal content may be segregated from one another because it is created and managed by the different groups (e.g., one group cannot see content that another creates). Alternatively, or in addition, a portal can comprise a unified portal that presents content from across a plurality of different groups using a common set of user interface displays.

Also, a portal can support a plurality of different languages. That is, in one particular example, portal 104 can be configured to provide content to users in English, German, French, and Spanish (and/or other language(s)). A language is selected, either manually, automatically, or semi-automatically, upon which the content in the portal is translated into the selected language and rendered to the user in the user interface displays. Alternatively, or in addition, the content provided by the portal can also be customized based on the location of the user.

In the illustrated example, architecture 100 allows administrator 128 to configure how the portal content is provide to the users on a portal-by-portal basis. That is, administrator 128 can customize how content provided by a first portal such that the first portal is branded differently than a second portal (e.g., it can be customized for a specific group). Also, architecture 100 allows administrator 128 to manage the languages and portal customizations (e.g., custom text strings) at each portal individually. As such, a plurality of the portals can use a same or similar set of forms, pages, articles, messaging, etc., but have portal-specific customizations. The customizations can include changes to a format and/or substance of the portal content.

By way of illustration, but not by limitation, portals 104 and 106 can be configured such that they present a form with user interface elements of different sizes and/or formats, and/or with different types or number of user interface elements. In the illustrated example, the text strings presented in each portal can be customized such that they are specific to the portal. For example, a user interface element to log a user out of portal 104 can include a text string "Log-out", whereas the same user interface element in portal 106 can have a text string "Sign-out". In another example, a string "Danke" presented on a German language page in portal 104 can be customized to be "Danke Schoen" in portal 106. In another example, a product field label on a form in portal 104 can include the text "Product Name", whereas the product field label on the same form in portal 106 can include the text "UPC Code." These, of course, are by way of example only.

In the illustrated example, to facilitate the configuration of the portals, architecture 100 utilizes one or more portal hierarchy models 158 that are stored in data store 134. A portal hierarchy model, in one example, comprises a plurality of configurable portal entities 160, which can be stored in data store 134, and represented by nodes in a hierarchical structure. Each portal entity 160 represents a set of one or more portals and is configurable to include data that defines a customization or other configuration of the portals. It is noted that the process for defining the structure of the portal hierarchy model(s) 158 and configurable portal entities 160 can be manual, automatic, or semi-automatic. In the illustrated example, administrator 128 uses a configuration system 162 to configure the portal entities to reflect desired changes to the portals.

Figure 2:
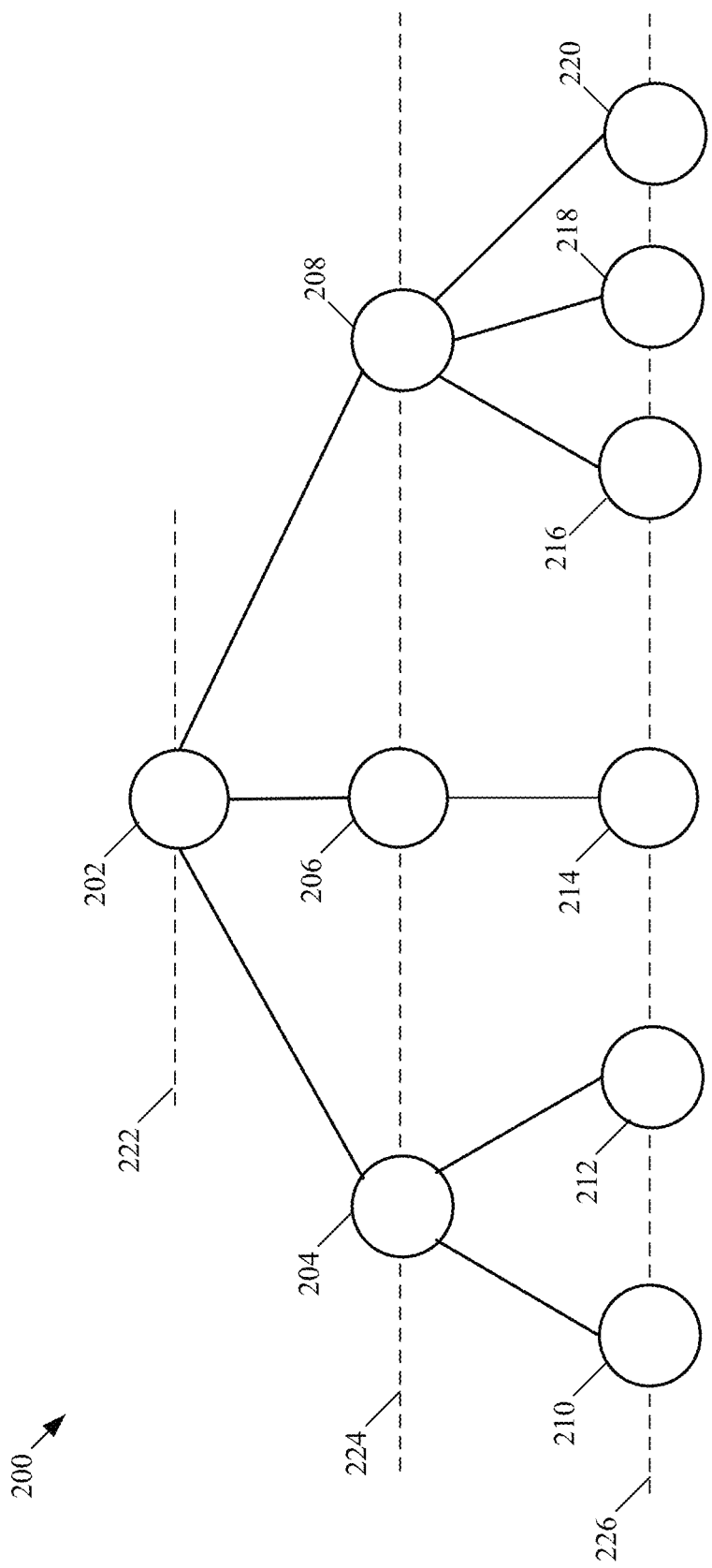
FIG. 2 illustrates one example of a portal hierarchy model.

FIG. 2 illustrates one example of a portal hierarchy model 200 that comprises a plurality of portal entities or objects 202, 204, 206, 208, 210, 212, 214, 216, 218, and 220 arranged in a plurality of hierarchical levels or tiers 222, 224, and 226. Each portal entity is represented as a node within a tree structure. The nodes are arranged in hierarchical parent/child relationships in which a parent node has one or more child nodes that depend therefrom, and each child node depends from at least one parent node. The number of levels (or tiers) and portal entities shown in FIG. 2 is by way of example only. Any number of portal entities and levels can be utilized.

Each portal entity represents a set of one or more portals and has associated portal configuration data that defines a configuration of the portal(s). For example, as similarly mentioned above, portal configuration data can define how portal content is translated into various languages as well as customizations or other changes to the text strings or other portal content. For example, portal configuration data can define a format of the user interface elements within the portals.

In this example, level 226 comprises a leaf level having leaf nodes, each representing a particular portal. For sake of illustration, portal entity 210 represents and includes portal configuration data for portal 104, entity 212 represents and includes portal configuration data for portal 106, and entity 214 represents and includes portal configuration data for portal 108. Level 224 comprises an intermediate level between the leaf level 226 and the root level 222. Root level 222 comprises a root entity or node 202. Each entity in intermediate level 224 represents a group or collection of portals from the leaf level. That is, due to the parent/child relationships within model 200, entity 204 represents portal 104 (which is also represented by entity 210) and portal 106 (which is also represented by entity 212). Entity 204 includes portal configuration data that can be used in rendering portals 104 and 106. As discussed in further detail below, during runtime, portal transformation and rendering component 163 uses the portal hierarchy model traversal component 164 to traverse the portal hierarchy model to identify portal configuration data to be used in rendering portal content for a particular portal. In one example, discussed in further detail below, component 164 first identifies the leaf node that represents a given portal being accessed by a user. Component 164 obtains the configuration data from that portal entity and, if needed, traverses or cascades up the portal hierarchy model toward the root node to identify additional portal configuration data. In one example, for a given user interface element, such as a text field on a form, runtime portal deployment system 148 determines whether a text string is defined for that user interface element at the leaf node. If not, system 148 traverses or cascades up the hierarchy model to the parent entity (i.e., entity 204) to determine whether the string is defined at that entity instead. If not, system 148 continues to traverse to the root level entity 202 to find the appropriate text string to be rendered for the user interface element.

In this manner, if a portal string translation is not defined at the leaf node for the portal, the portal can inherit, by cascading the hierarchy during runtime, a translation from a higher level node in the hierarchy. In one example, if, for a given user interface element, a string is not defined for the selected portal language, the portal can inherit a default translation from the root level node. In other words, if there is no string available in the selected language for the user interface element, a default language can be utilized at the root level.

By way of illustration, assume that the user has selected Arabic as the desired portal language, but there is no Arabic text string defined for a portal logout button. In this example, if English is the default language, the system will select the English string defined for the logout button and render that string in the user interface. In one example, if no string definition is identified, language translation knowledge 182 (such as a language pack) can be utilized to identify a translation that is used as the default translation.

Architecture 100 advantageously allows an administrator or other user to define portal configuration data at a single portal entity such that the configuration data applies to a plurality of portals. For example, administrator 128 can define a custom text string at entity 204 where the text string is identified and rendered for each of the portals represented by entities 210 and 212. Alternatively, if administrator 128 desires a different text string to be rendered for the portals, administrator 128 can define a different text string at entity 210.

This facilitates a flexible and robust portal configuration architecture that enables configurations and customizations to be made on a portal-by-portal basis. This allows the portals to be easily branded and tailored individually to provide a rich and meaningful portal experience to the end users. Further, a change can be reflected across a plurality of portals without requiring that the change be made numerous times at each portal individually. This also reduces the required data storage space as the configuration data need only be stored with a parent entity rather than at each of the child entities.

Referring again to FIG. 1, portal development system 146 includes a provisioning system 166 that includes a portal hierarchy model creation component 168, a default language definition component 170, and a mapping component 172. Provisioning system 166 can include other items 174 as well.

Portal hierarchy model creation component 168 is configured to create portal hierarchy models 158 automatically and/or in response to user input. For example, during a provisioning process in which a client organization signs up for a portal service provided by architecture 100, component 168 creates portal entities and associations between the portal entities in hierarchy model for the organization.

Default language definition component 170 is configured to define a default language for the portal hierarchy, which can also be done automatically or in response to user input. The default language can be used, in one example, if a text string is not located in a selected portal language.

Mapping component 172 is configured to map assigned languages to portal entities in a portal hierarchy model. As mentioned above, a given portal entity can be assigned a plurality of different languages that are available at the portal. Customized strings can be created for any language assigned to the portal entity.

Configuration system 162 includes a portal customization component 176 and a language assignment component 178. Configuration system 162 can include other items 180, as well. Language assignment component 178 is configured to assign the languages that are mapped to the portal entities, either automatically and/or in response to user input. Assigning a language to a portal entity is discussed in further detail below.

Portal customization component 176 is configured to use display system controller 152 to control display system 138 to generate portal configuration user interface displays through which administrator 128 (or other user) can configure and customize one or more of the portals. Portal customization component 176 generates portal configuration data which is stored with the respective portal entities 160.

Figure 3:
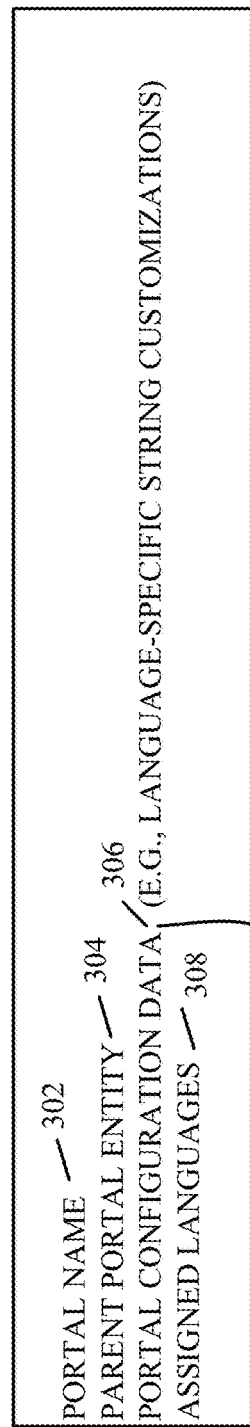
FIG. 3 is a schematic illustration of a portal entity, in one example.

FIG. 3 is a simplified schematic illustration of portal entity 210, in one example. Portal entity 210 can have any suitable data structure. As illustrated, portal entity 210 has a portal name attribute 302 that identifies the portal represented by entity 210 in portal hierarchy model 200. Portal entity 210 also includes a parent portal entity attribute 304, portal configuration data 306, and assigned languages 308. The parent portal entity attribute 304 points to or otherwise identifies the parent entity in the hierarchy model. In the case of portal entity 210 in FIG. 2, parent portal entity attribute 304 points to portal entity 204, to facilitate the traversal of the hierarchy model during runtime. Assigned languages 308 identifies one or more languages that are assigned to or activated at portal 104. These languages are available for access at portal entity 210, for example to customize portal strings in those languages.

Portal configuration data 306 defines various customizations to portal 104. In one example, configuration data 306 includes strings in a plurality of different languages that can be rendered in portal 104.

As illustrated, configuration data 306 comprises a table 310 having a plurality of entries 312, 314, 316, and 320. Each entry 312-320 defines a configuration of the portal, in this case language-specific string customizations. Entry 312 defines that, when portal 104 is rendered in English, a user interface element (i.e., a portal logout button having a "portal.logout" GUID) will be rendered to include the text string "SIGN-OUT" whereas, when portal 104 is rendered in German, the user interface element will be rendered to include the text string "Danke Schoen." These text string definitions can differ from definitions for the same interface elements at higher level nodes in portal hierarchy model 200. For example, entity 202 can include portal configuration data that associates the text string "LOG-OUT" to the "portal.logout" GUID for English.

As discussed in further detail below, when rendering portal 104 at runtime, preference is given to portal configuration data defined at lower level nodes in portal hierarchy model 200. In other words, portal configuration data (e.g., a text string definition) that is defined at a leaf node entity in portal hierarchy model 200 overrides portal configuration data in higher level node entities.

Figure 4:
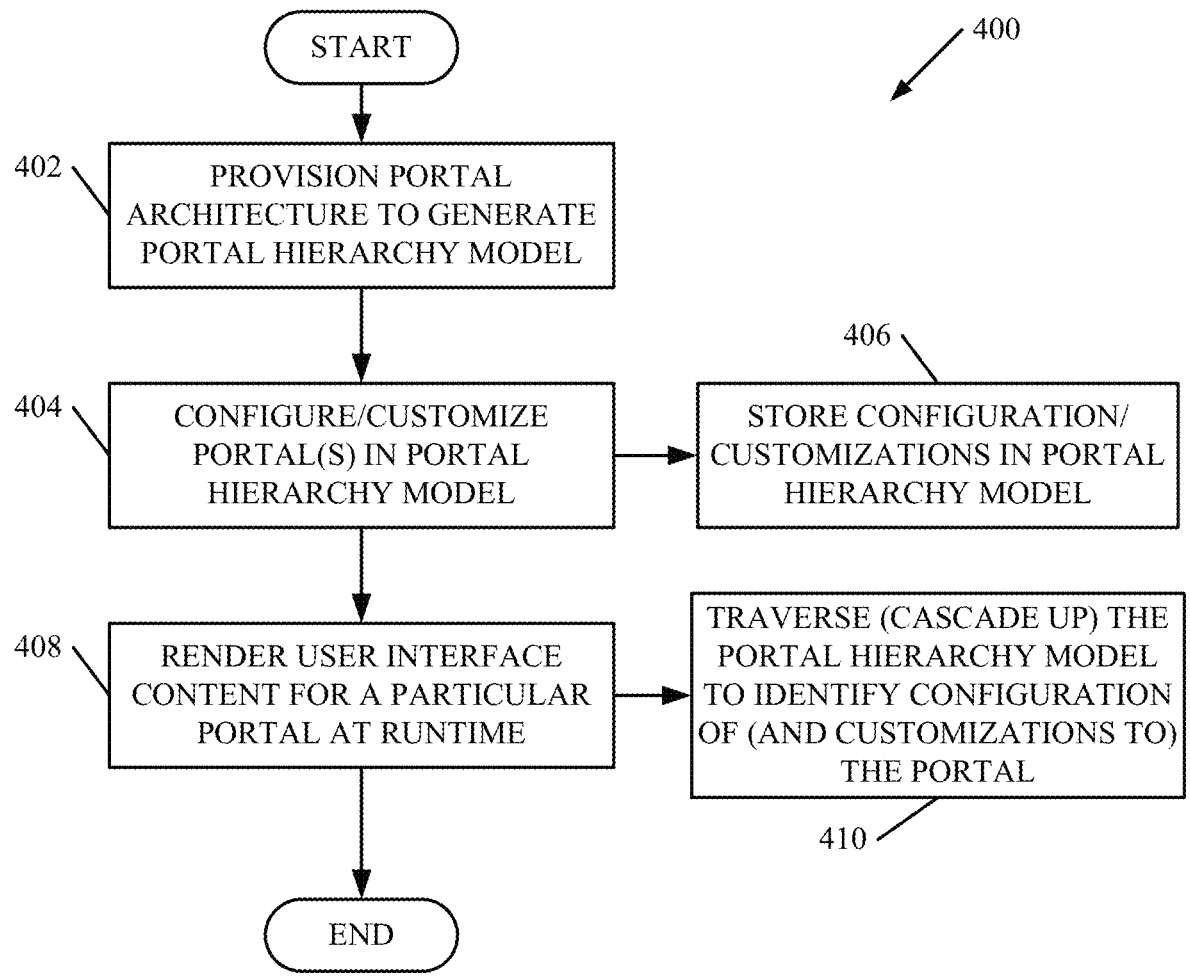
FIG. 4 is a flow diagram illustrating one example of a method for developing and deploying a portal.

FIG. 4 is a flow diagram illustrating one example of a method 400 for developing and deploying a portal. For the sake of illustration, but not by limitation, method 400 will be described in the context of architecture 100 generating and rendering user interface content for portal 104.

At block 402, provisioning system 166 provisions the portal architecture to generate a portal hierarchy model. For example, an organization signs up for a portal service provided by architecture 100, upon which provisioning system 166 generates a portal hierarchy model 158 for that organization. Then, administrator 128 or other user of the organization can configure and customize the portal hierarchy model as desired at block 404.

In one example, administrator 128 defines various string customizations and translations to be rendered in the portal 104 when accessed by a user 114. These configurations can be stored in portal hierarchy model 158 at block 406. At block 408, a request to render the user interface content is received from user 114 and runtime portal deployment system 148 renders the user interface content. In the illustrated example, at block 410, portal hierarchy model traversal component 164 traverses or cascades up the portal hierarchy model to identify the configuration of and customizations to the portal. In one example, for each user interface element to be rendered in the portal, the hierarchy model is traversed to identify a string or other configuration data for rendering the user interface element.

Figure 5:
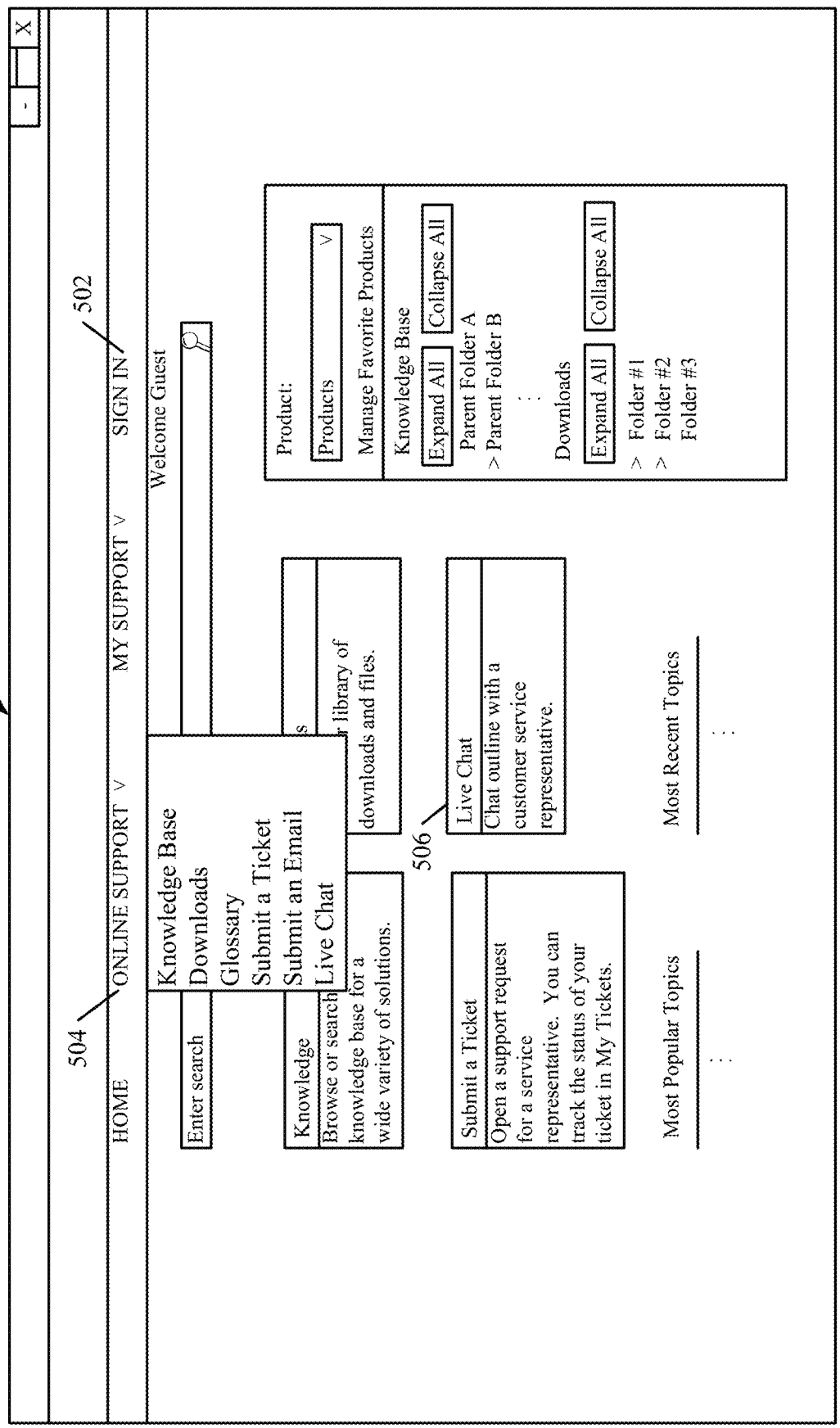
FIG. 5 illustrates one example of a portal user interface display.

For sake of illustration, but not by limitation, FIG. 5 illustrates a portal user interface display 500. In this example, portal user interface display 500 comprises a page of a customer service portal. As shown, display 500 has a plurality of user interface elements including, but not limited to, a sign-in button 502, a support menu button 504 and a live chat button 506 to initiate a live chat session with a customer service representative. For each of these user interface elements, block 410 in method 400 identifies the respective string to populate the user interface element by traversing the portal hierarchy model. It is noted that, for a given portion of portal content (such as a user interface element), there can be multiple different textual strings defined at multiple different portal entities in hierarchy model 200. In one example, the first textual string definition that is identified while cascading up the hierarchy model is selected for rendering the portal. This is discussed in further detail below.

Figure 6:
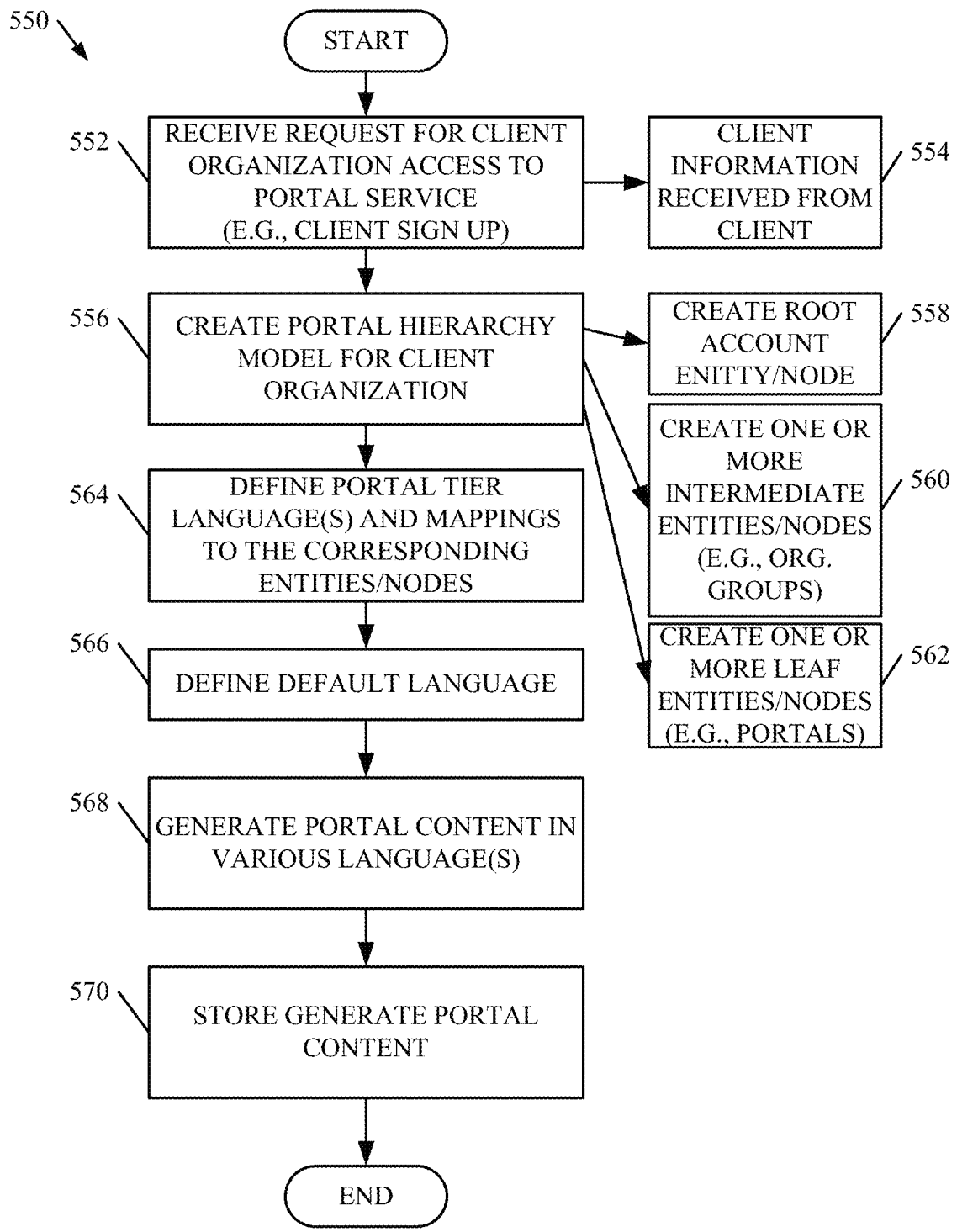
FIG. 6 is a flow diagram of one example of a method for provisioning a portal architecture.

FIG. 6 is a flow diagram of one example of a method 550 for provisioning the portal architecture at block 402 in FIG. 4. At block 552, a request for access to a portal service is received for a client organization, such as a client sign-up request. This request can include client information received at block 554.

At block 556, portal hierarchy model creation component 168 creates a portal hierarchy model for the client organization. This can include creating a root account entity or node at block 558, creating one or more intermediate entities or nodes at block 560, and creating one or more leaf entities or nodes at block 562. The number of intermediate and leaf entities can be pre-defined and/or based on input from the client organization. For instance, the method can determine a number of different organization groups within the client organization for which to create intermediate entities at block 560, as well as the number of portals to be provided within each of those groups.

At block 564, the portal tier languages are defined and mapped to the corresponding entities. This is performed by mapping component 172, in one example. For instance, a plurality of different languages can be assigned to the root account entity such that the plurality of languages are available at the child entities during configuration and deployment of the portals. In one example, at block 564 a portal can have different versions of a same language, such as location-specific variants. The available languages can be provided to the end user at runtime for selection of a desired language with which to render the portal.

At block 566, a default language can be defined for the portal hierarchy. In one example, this is done automatically and/or in response to input from an administrator.

At block 568, portal content is generated in the various languages defined at block 564. For example, if the German language is assigned to the root entity, block 568 generates or otherwise obtains translations for the portal content in the German language, for example using a language pack or other language translation knowledge 182.

For sake of illustration, but not by limitation, if a form is to be provided within the portal, block 568 generates German language translations for the form content that can be further customized by the administrator at various child entities in the intermediate and/or leaf tiers and rendered at runtime. In one example, for a form containing a text string "Thank You" in English, the language translation knowledge 182 is utilized to translate the language into "Danke" when the German language is activated at the root account entity. Then, for a particular intermediate entity that represents a particular department within the organization, the administrator can activate the German language at the intermediate entity and then create and override the string from the root account entity (e.g., changing "Danke" to "Danke Schoen"). At block 570, the generated portal content is stored in data store 134.

Figure 7:
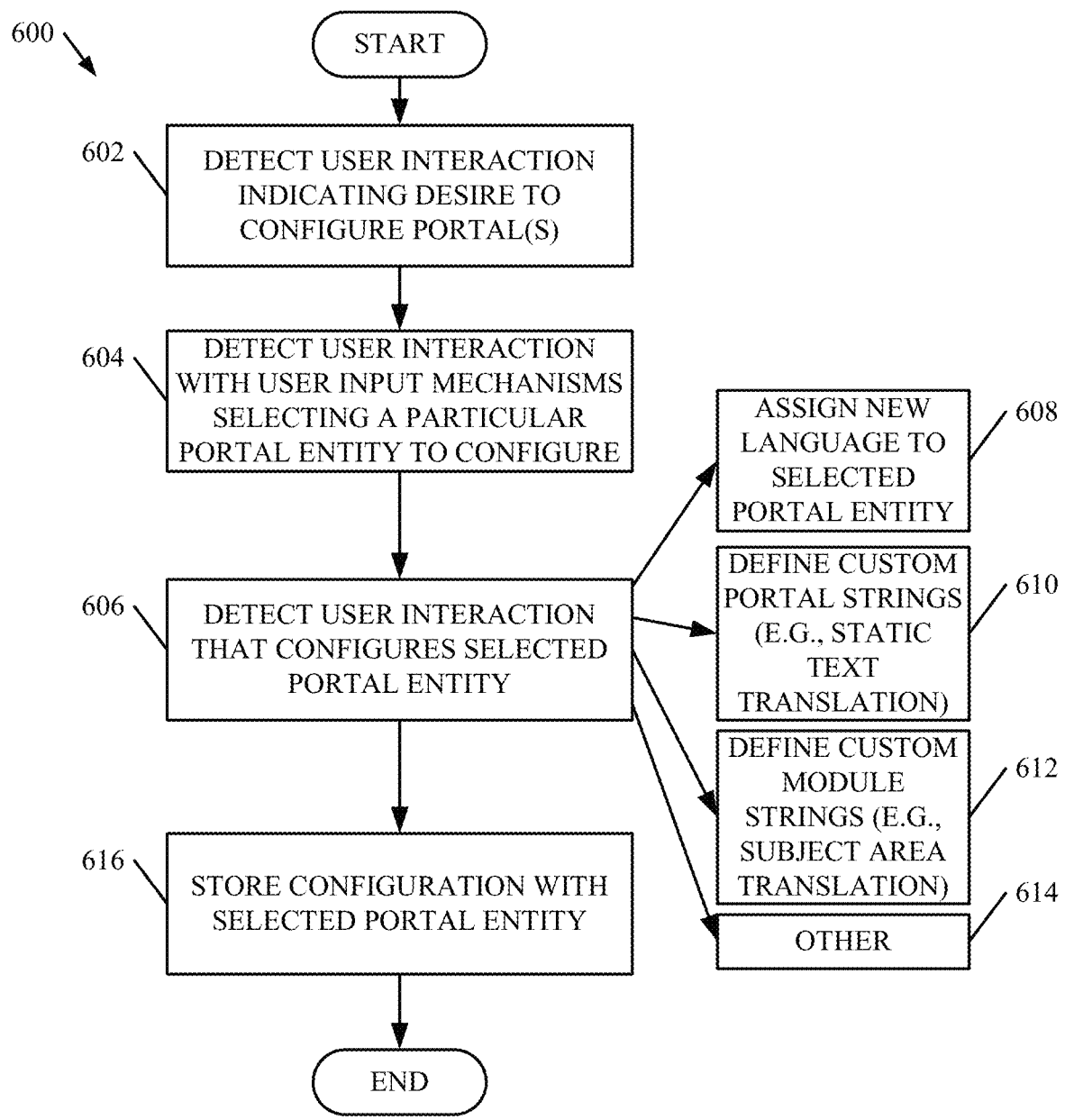
FIG. 7 is a flow diagram of one example of a method for configuring portals within a portal architecture.

FIG. 7 is a flow diagram of one example of a method 600 for configuring portals within architecture 100. At block 602, a user interaction is detected that indicates a desire to configure one or more portals. For example, administrator 128 can initiate a configuration process using configuration system 162. Then, a portal configuration user interface display with user input mechanisms can be displayed that facilitates configuration of the portals.

At block 604, a user interaction with the user input mechanisms is detected that selects a particular portal entity to configure. A user interaction that configures the selected portal entity is detected at block 606. For example, the user interaction can assign a new language to the selected portal entity at block 608, define custom portal strings at block 610, and/or define custom module strings at block 612. Other configurations can be performed as well. This is represented by block 614. At block 616, the configuration is stored with the selected portal entity.

Figure 8:
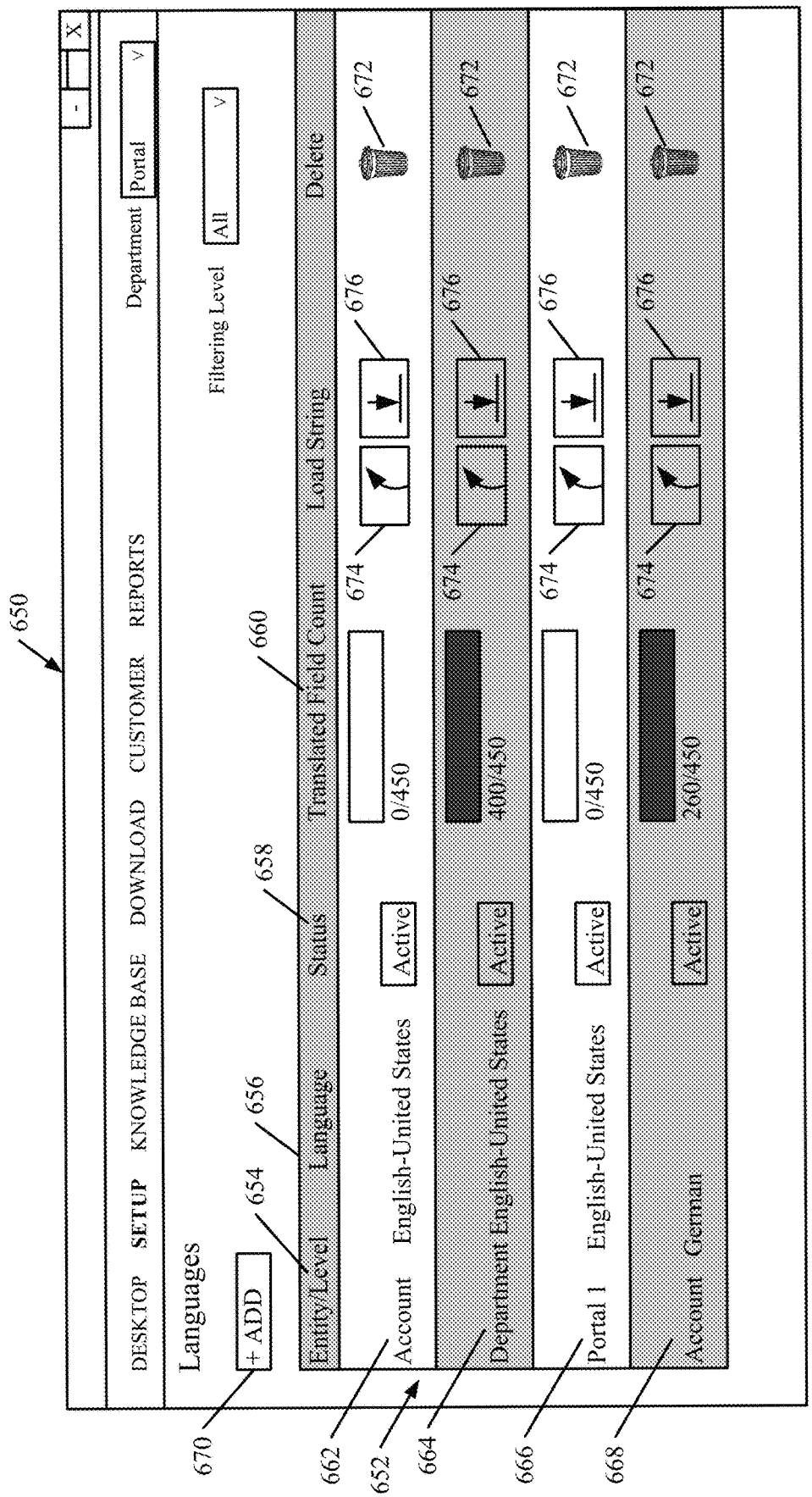
FIG. 8 illustrates one example of a user interface display.

FIG. 8 illustrates one example of a user interface display 650 with user input mechanisms for defining the portal tier languages. User interface display 650 displays a list 652 of language assignment entries, each identifying a language assigned to a given portal entity. Each entry in list 652 has an entity field 654 that identifies the entity or level within the portal hierarchy, a language field 656 that identifies an assigned language, a status field 658 indicating whether the assigned language is active for configuration and/or selection on the portal, and a translated field count 660.

In the illustrated example, entry 662 assigns a first language (i.e., English) to an account level portal entity (e.g., entity 202), entry 664 assigns a first language (i.e., English) to a department level portal entity (e.g., entity 204), entry 666 assigns a first language (i.e., English) to a portal or leaf level portal entity (e.g., entity 210), and entry 668 assigns a second language (i.e., German) to the account level portal entity. Additional entries can be added using user interface control 670. An entry can be deleted using a corresponding delete button 672. String definitions for each portal language can be imported and/or exported using user interface controls 674 and 676, respectively. In one example, a user interface element in field 660 is user actuatable to navigate to a user interface to edit the portal strings within the respective portal entity.

Figure 9:
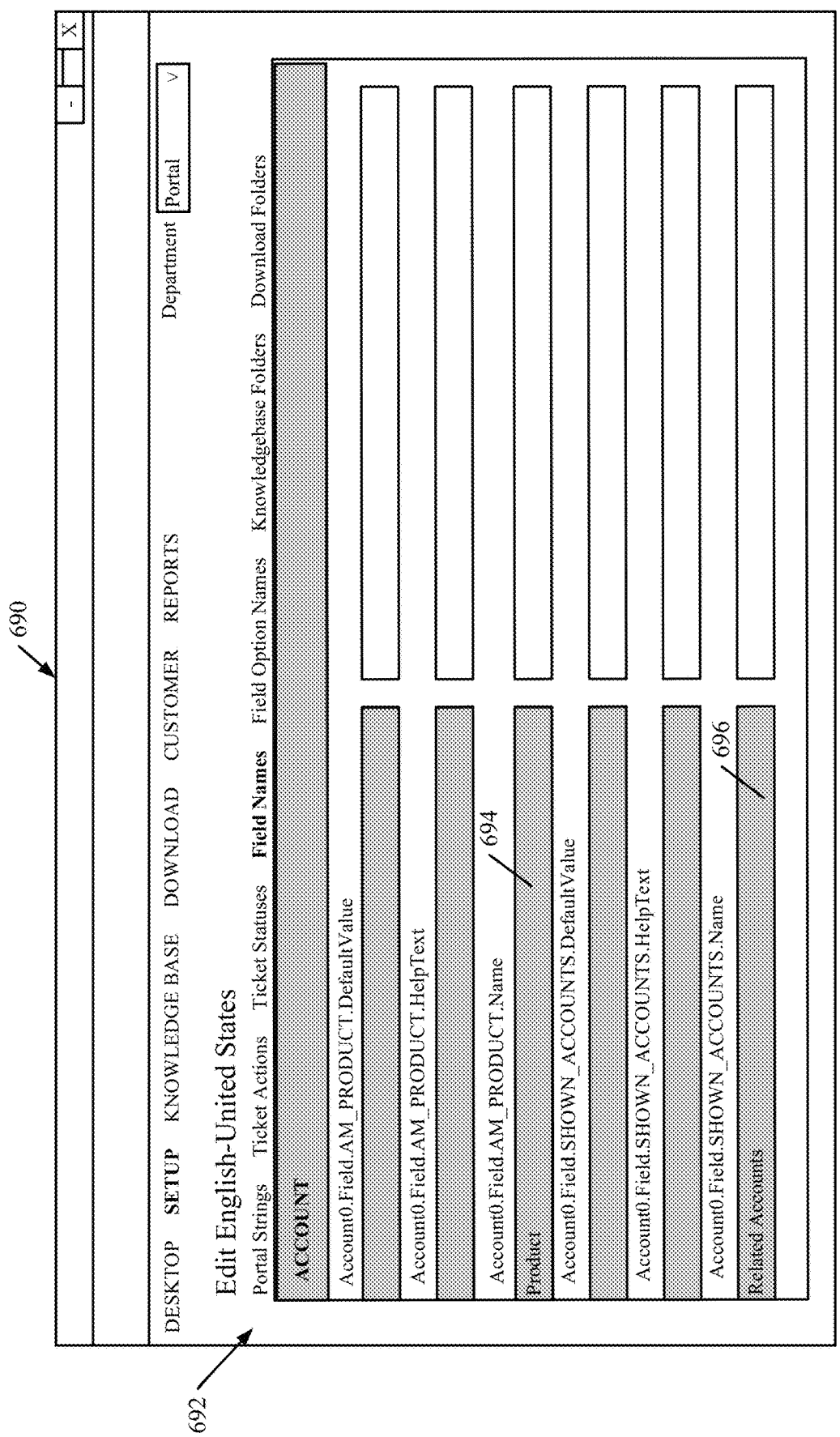
FIG. 9 illustrates one example of a user interface display for editing strings within a given portal entity.

FIG. 9 illustrates one example of a user interface 690 for editing strings within a given portal entity. In the present example, user interface 690 is displayed in response to a user selecting the "English-United States" language in entry 662. User interface 690 has a plurality of user input mechanisms 692 for defining strings for various portal user interface elements. For instance, user input mechanism 694 is configured to receive a custom string for a product name user interface element. If the user prefers to have the string "Item" displayed instead of the string "Product", the user can use user input mechanism 694 to change the string accordingly. Similarly, user input mechanism 696 is configured to receive a custom string for an account name user interface element.

Figure 10:
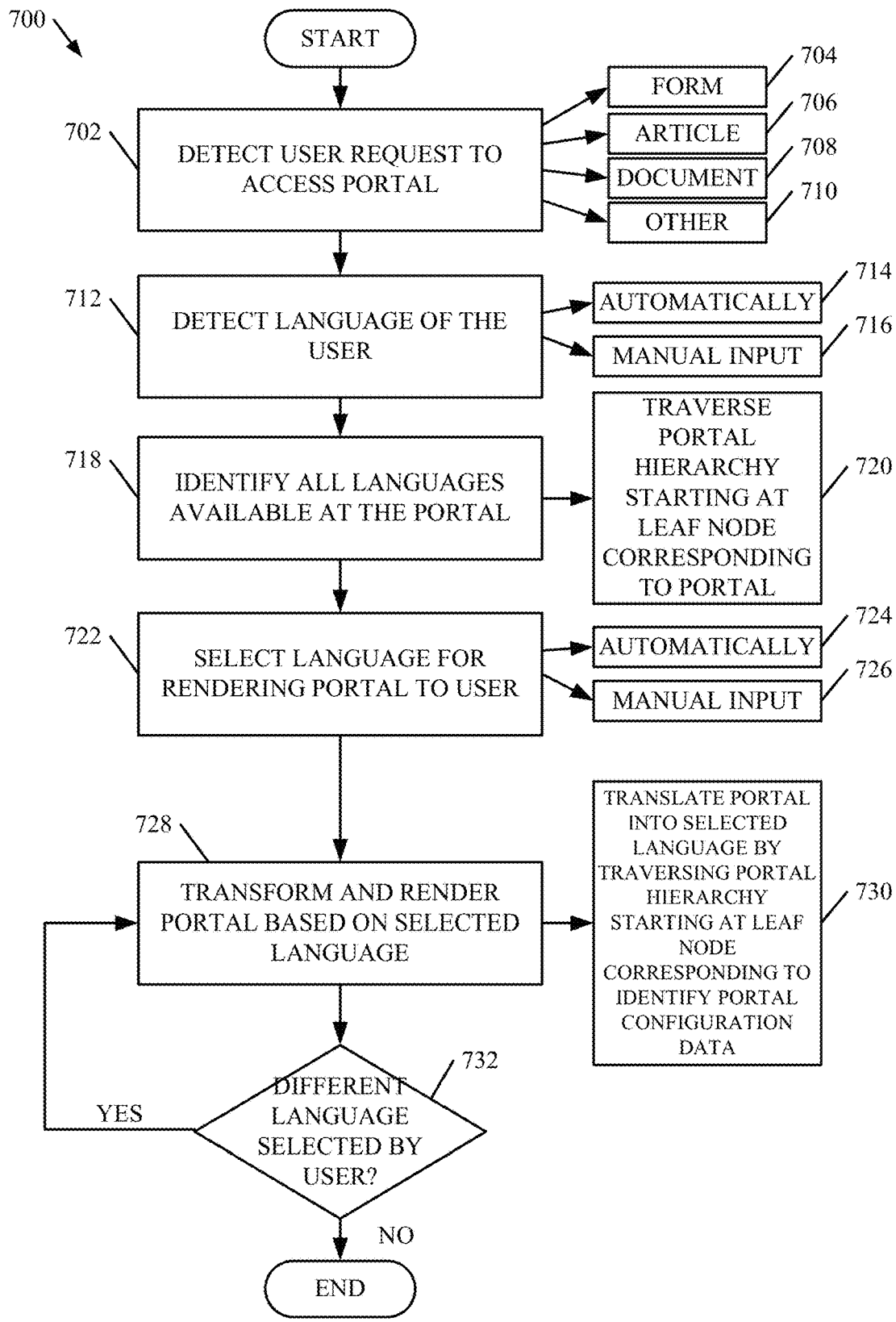
FIG. 10 is a flow diagram of one example of a method for deploying a portal at runtime.

FIG. 10 is a flow diagram of one example of a method 700 for deploying a portal at runtime. For sake of illustration, but not by limitation, method 700 will be described in the context of runtime portal deployment system 148 illustrated in FIG. 1.

At block 702, a user request to access a portal is detected. This can include, but is not limited to, a user requesting a form (represented by block 704), an article (represented by block 706), a document (represented by block 708), or other content (represented by block 710).

At block 712, a language of the user is detected for use in rendering the portal content. This can be done automatically (represented by block 714) and/or based on manual input (represented by block 716). For instance, system 148 can identify a location of the user and/or language settings associated with the user (e.g., a language setting in a browser, a user profile, etc.).

At block 718, system 148 identifies all languages available at the portal. In one example, this is done by traversing the portal hierarchy starting at the leaf node corresponding to the portal. This is represented by block 720. For instance, if the user is accessing portal 104, system 148 identifies portal entity 210 in the portal hierarchy model 158 corresponding to portal 104, and then identifies any languages that are assigned to portal entity 210. Then, using traversal component 164, the hierarchy model 158 is traversed from the node corresponding to portal entity 210 to its parent node (i.e., entity 204), and then to the parent node (i.e., entity 202) of entity 204. Any languages available at the traversed nodes are identified as available languages.

From these available languages, a selected language is selected for rendering the portal to the user. This is represented at block 722. For example, this can be done automatically at block 724, such as by selecting the most appropriate available language based on the language of the user detected at block 712. In another example, selection of a language can be done based on manual input at block 726. For example, a list of the available languages can be provided to the user in a user interface element (e.g., a drop down box, etc.) upon which the user selects one of the languages.

At block 728, the portal is transformed and rendered based on the selected language. In the illustrated example, this includes translating the portal into the selected language by traversing the portal hierarchy starting at the leaf node corresponding to the portal to identify portal configuration data. The portal configuration data can define string translations as well as other customizations to the strings within the portal.

At block 732, a different language can be selected by the user, for example from the user interface element presented at block 722. In response to selecting a new language, the portal is transformed and rendered for the newly selected language.

Figure 11:
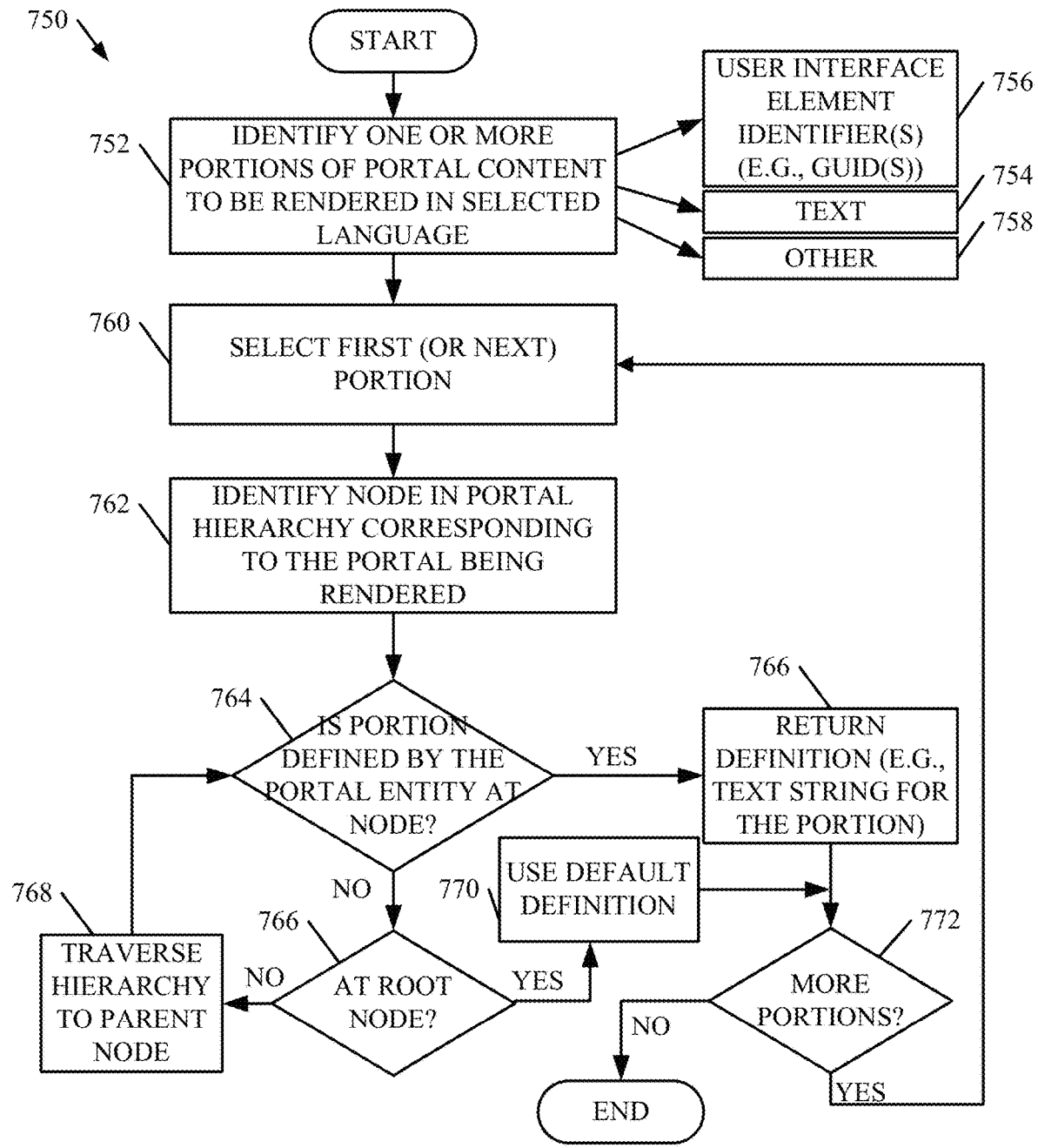
FIG. 11 is a flow diagram of one example of a method for transforming and rendering a portal.

FIG. 11 is a flow diagram of one example of a method 750 for transforming and rendering the portal at block 728 shown in FIG. 10. At block 752, one or more portions of portal content to be rendered in the selected language are identified. In one example, this can comprise identifying portions of text to be rendered within the portal. This is represented by block 754. In one example, a portion of portal content comprises a user interface element having a unique identifier, such as a globally unique identifier (GUID). This is represented by block 756. For example, in the case of a form, the user interface elements comprise a logout button having a GUID "portal.logout" and a label for a product name input field having a GUID "product.name." Of course, the portions of portal content can be of other types as well. This is represented by block 758.

At block 760, portal transformation and rendering component 162 selects a first one of the portions, using component 164, and identifies the node in the portal hierarchy corresponding to the portal being rendered. At block 764, component 164 determines whether the portion is defined by the portal entity at the identified node. If so, component 164 returns the definition at block 766. For sake of illustration, in the above example the leaf node that represents the given portal includes configuration data that identifies the text string "Logout" for the GUID "portal.logout." In this case, block 766 returns the text string "Logout" for rendering for that user interface element. If the portion of portal content is not defined at block 764, component 164 determines whether the node is the root node in the hierarchy at block 766 and then, if not, traverses the hierarchy to a parent node at block 768 to determine whether the portion is defined by the parent node by returning to block 764.

If it is determined that the method is at the root node, at block 766, a default definition is used at block 770. This can include, in one example, selecting a default language to obtain a text string for the portion of portal content to be rendered. At block 772, the method determines whether there are any more portions for which to obtain definitions. If so, the method returns to block 760 for a next portion of the portal content.

It can thus be seen that the present description provides significant technical advantages. As mentioned above, in illustrated examples, the present description provides a portal development and deployment architecture that allows portals to be separately and independently configured to tailor or customize the portal content in any of a variety of ways. In this manner, the architecture facilitates flexible and robust portal configurations and customizations on a portal-by-portal basis, which allows portals to be easily branded and tailored individually to provide a rich and meaningful portal experience to the end users. Further, a change can be reflected across a plurality of portals without requiring that the change be made numerous times at each portal individually. For example, an administrator can perform a single customization for the portal content at an upper level node in the hierarchy to have that configuration inherited by the lower level portal nodes during runtime, without having to perform a plurality of separate configuration processes for each portal. This improves the user experience, reduces the likelihood of configuration errors, and reduces configuration time. Also, the required storage overhead is reduced as the configuration data is not populated for storage down to each portal entity.

The present discussion has mentioned processors and servers. In one example, the processors and servers include computer processors with associated memory and timing circuitry, not separately shown. They are functional parts of the systems or devices to which they belong and are activated by, and facilitate the functionality of the other components or items in those systems.

Also, a number of user interface displays have been discussed. They can take a wide variety of different forms and can have a wide variety of different user actuatable input mechanisms disposed thereon. For instance, the user actuatable input mechanisms can be text boxes, check boxes, icons, links, drop-down menus, search boxes, etc. They can also be actuated in a wide variety of different ways. For instance, they can be actuated using a point and click device (such as a track ball or mouse). They can be actuated using hardware buttons, switches, a joystick or keyboard, thumb switches or thumb pads, etc. They can also be actuated using a virtual keyboard or other virtual actuators. In addition, where the screen on which they are displayed is a touch sensitive screen, they can be actuated using touch gestures. Also, where the device that displays them has speech recognition components, they can be actuated using speech commands.

A number of data stores have also been discussed. It will be noted they can each be broken into multiple data stores. All can be local to the systems accessing them, all can be remote, or some can be local while others are remote. All of these configurations are contemplated herein.

Also, the figures show a number of blocks with functionality ascribed to each block. It will be noted that fewer blocks can be used so the functionality is performed by fewer components. Also, more blocks can be used with the functionality distributed among more components.

Figure 12:
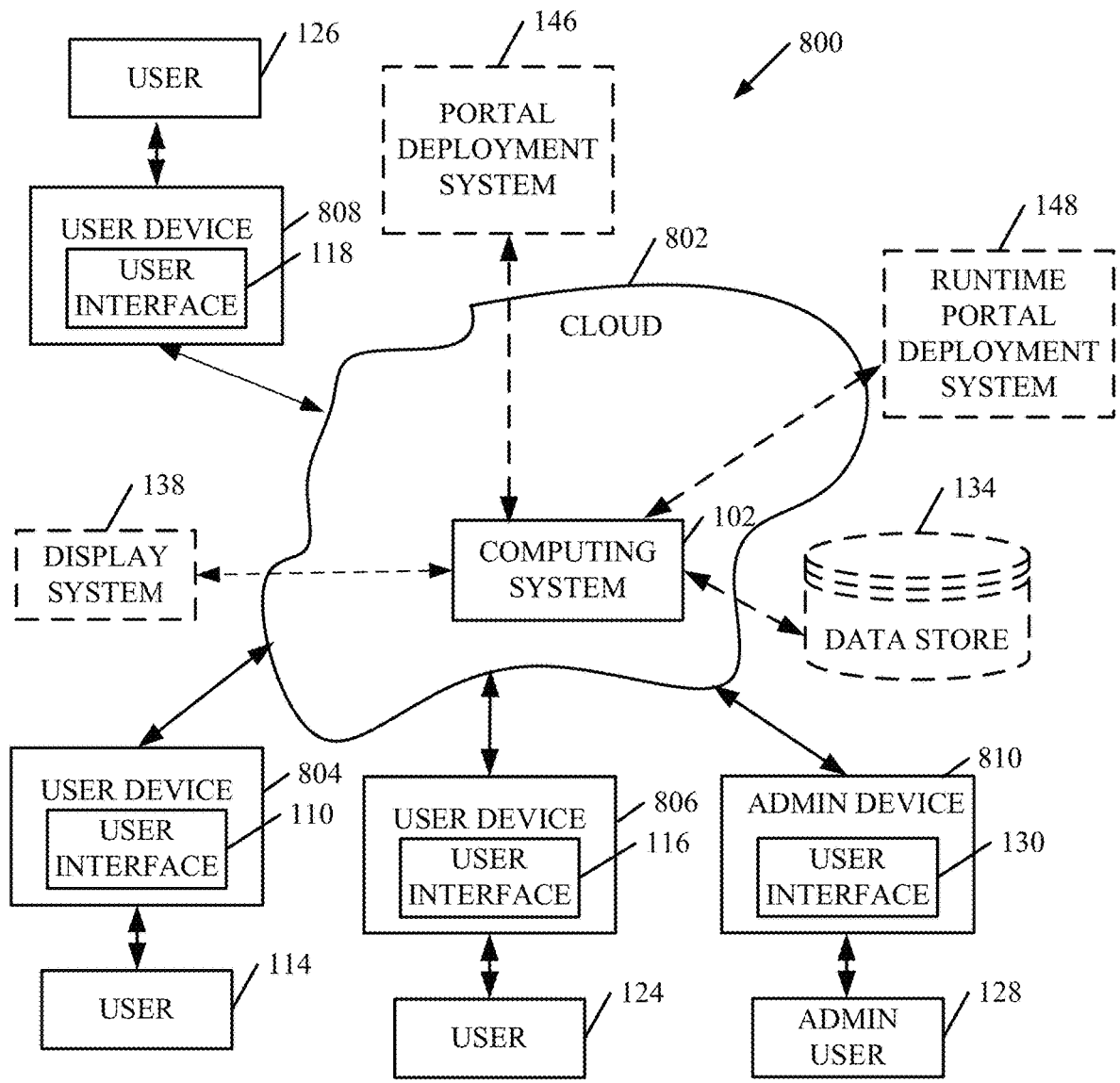
FIG. 12 is a block diagram showing one example of the architecture illustrated in FIG. 1, deployed in a cloud computing architecture.

FIG. 12 is a block diagram of a cloud computing architecture 800. Cloud computing provides computation, software, data access, and storage services that do not require end-user knowledge of the physical location or configuration of the system that delivers the services. In various examples, cloud computing delivers the services over a wide area network, such as the internet, using appropriate protocols. For instance, cloud computing providers deliver applications over a wide area network and they can be accessed through a web browser or any other computing component. Software or components of architecture 100 as well as the corresponding data, can be stored on servers at a remote location. The computing resources in a cloud computing environment can be consolidated at a remote data center location or they can be dispersed. Cloud computing infrastructures can deliver services through shared data centers, even though they appear as a single point of access for the user. Thus, the components and functions described herein can be provided from a service provider at a remote location using a cloud computing architecture. Alternatively, they can be provided from a conventional server, or they can be installed on client devices directly, or in other ways.

The description is intended to include both public cloud computing and private cloud computing. Cloud computing (both public and private) provides substantially seamless pooling of resources, as well as a reduced need to manage and configure underlying hardware infrastructure.

A public cloud is managed by a vendor and typically supports multiple consumers using the same infrastructure.

Also, a public cloud, as opposed to a private cloud, can free up the end users from managing the hardware. A private cloud may be managed by the organization itself and the infrastructure is typically not shared with other organizations. The organization still maintains the hardware to some extent, such as installations and repairs, etc.

In the example shown in FIG. 12, some items are similar to those shown in FIG. 1 and they are similarly numbered. FIG. 12 specifically shows that some or all components of architecture 100 are located in cloud 802 (which can be public, private, or a combination where portions are public while others are private). Therefore, users 114, 124, and 126 use user devices 804, 806, and 808 to access those components through cloud 802. Similarly, administrator 128 uses an administrator device 810 to access the components through cloud 802.

FIG. 12 also depicts another example of a cloud architecture. FIG. 12 shows that it is also contemplated that some elements of architecture 100 are disposed in cloud 802 while others are not. By way of example, data store 134 can be disposed outside of cloud 802, and accessed through cloud 802. In another example, display system 138 can be disposed outside of cloud 802, and accessed through cloud 802. In another example, portal deployment system 146 can be disposed outside of cloud 802, and accessed through cloud 802. In another example, runtime portal deployment system 148 can be disposed outside of cloud 802, and accessed through cloud 802. Regardless of where they are located, they can be accessed directly by devices 804, 806, 808 and/or 810, through a network (either a wide area network or a local area network), they can be hosted at a remote site by a service, or they can be provided as a service through a cloud or accessed by a connection service that resides in the cloud. All of these architectures are contemplated herein.

It will also be noted that architecture 100, or portions of it, can be disposed on a wide variety of different devices. Some of those devices include servers, desktop computers, laptop computers, tablet computers, or other mobile devices, such as palm top computers, cell phones, smart phones, multimedia players, personal digital assistants, etc.

Figure 13:
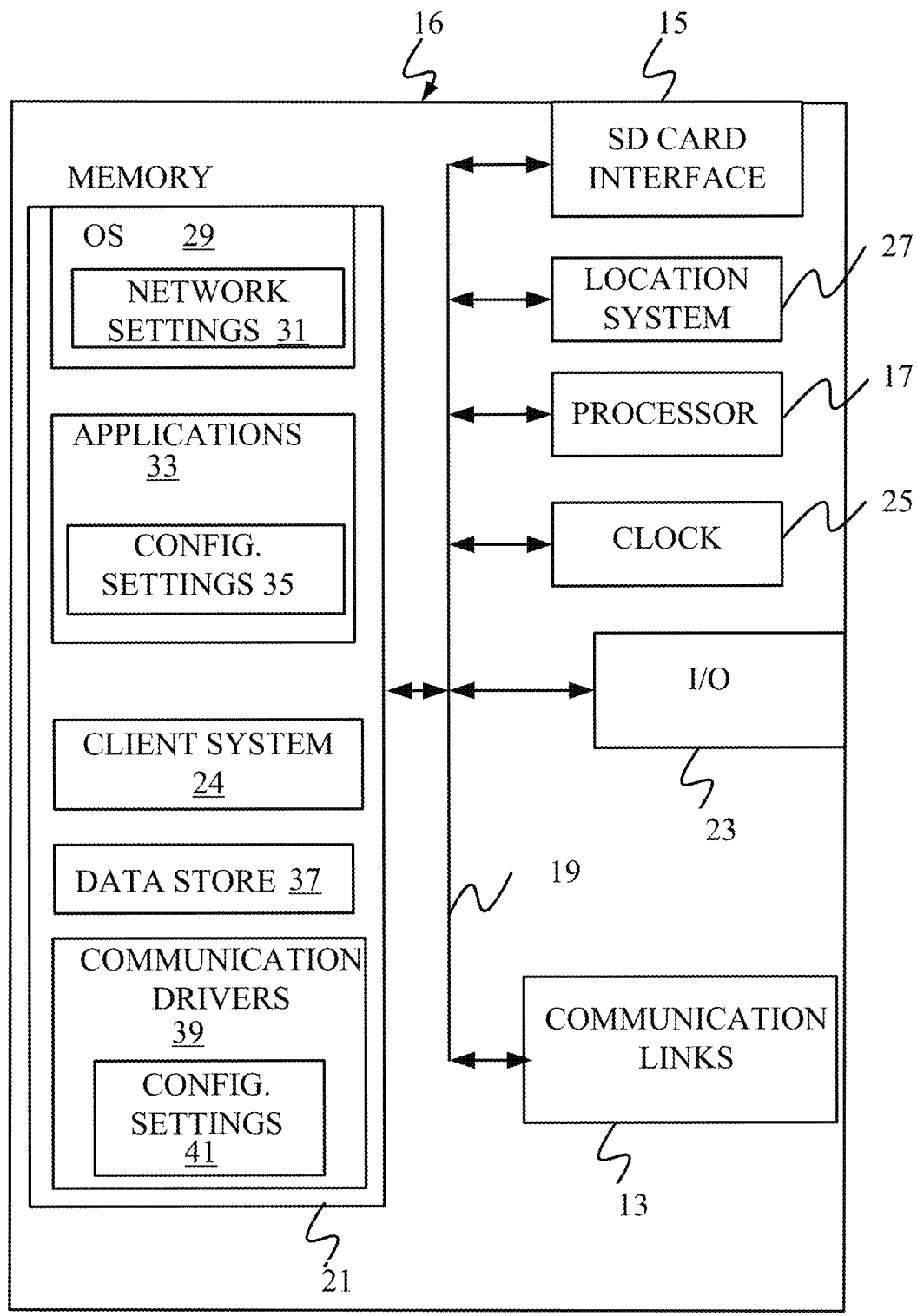
FIGS. 13-15 show various examples of mobile devices that can be used in the architectures discussed in the previous figures.
Figure 14:
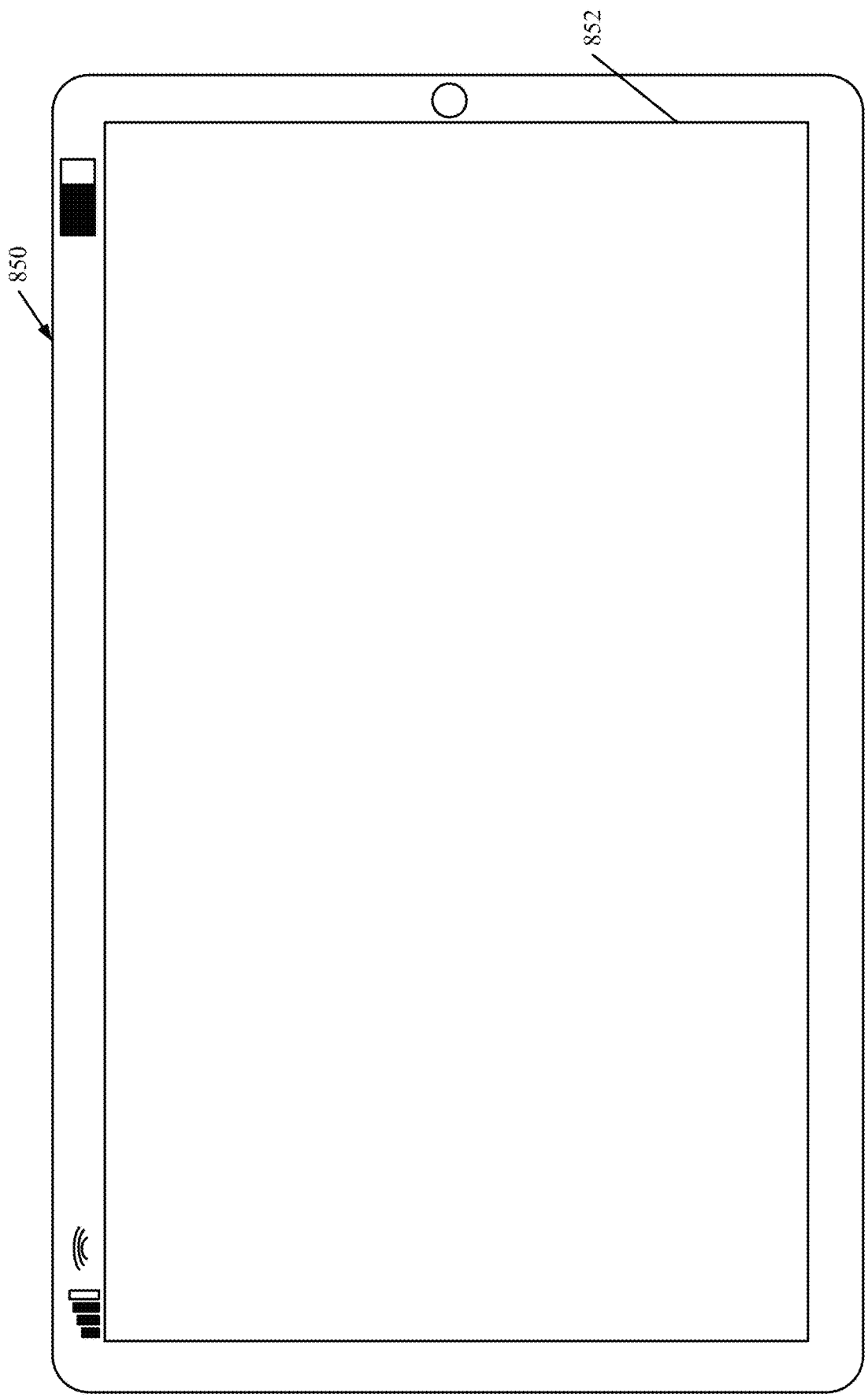
Figure 15:
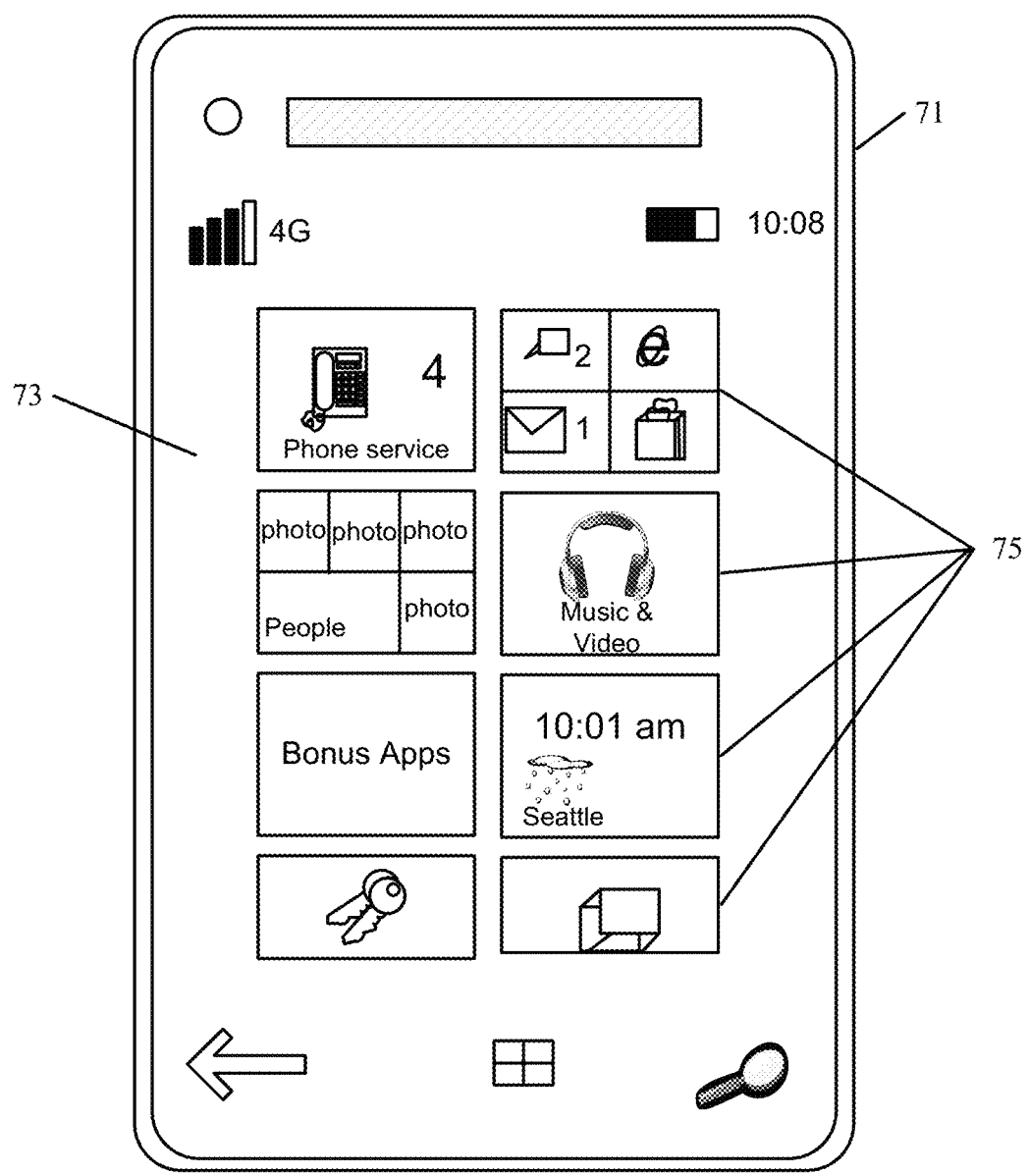

FIG. 13 is a simplified block diagram of one example of a handheld or mobile computing device that can be used as a user's or client's hand held device 16, in which the present system (or parts of it) can be deployed. FIGS. 14-15 are examples of handheld or mobile devices.

FIG. 13 provides a general block diagram of the components of a client device 16 that can run components of architecture 100 or that interacts with architecture 100, or both. In the device 16, a communications link 13 is provided that allows the handheld device to communicate with other computing devices and under some examples provides a channel for receiving information automatically, such as by scanning. Examples of communications link 13 include an infrared port, a serial/USB port, a cable network port such as an Ethernet port, and a wireless network port allowing communication though one or more communication protocols including General Packet Radio Service (GPRS), LTE, HSPA, HSPA+ and other 3G and 4G radio protocols, 1×rtt, and Short Message Service, which are wireless services used to provide cellular access to a network, as well as 802.11 and 802.11b (Wi-Fi) protocols, and Bluetooth protocol, which provide local wireless connections to networks.

Under other examples, applications or systems are received on a removable Secure Digital (SD) card that is connected to a SD card interface 15. SD card interface 15 and communication links 13 communicate with a processor 17 along a bus 19 that is also connected to memory 21 and input/output (I/O) components 23, as well as clock 25 and location system 27.

I/O components 23, in one example, are provided to facilitate input and output operations. I/O components 23 for various examples of the device 16 can include input components such as buttons, touch sensors, multi-touch sensors, optical or video sensors, voice sensors, touch screens, proximity sensors, microphones, tilt sensors, and gravity switches and output components such as a display device, a speaker, and or a printer port. Other I/O components 23 can be used as well.

Clock 25 illustratively comprises a real time clock component that outputs a time and date. It can also, illustratively, provide timing functions for processor 17.

Location system 27 illustratively includes a component that outputs a current geographical location of device 16. This can include, for instance, a global positioning system (GPS) receiver, a LORAN system, a dead reckoning system, a cellular triangulation system, or other positioning system. It can also include, for example, mapping software or navigation software that generates desired maps, navigation routes and other geographic functions.

Memory 21 stores operating system 29, network settings 31, applications 33, application configuration settings 35, data store 37, communication drivers 39, and communication configuration settings 41. Memory 21 can include all types of tangible volatile and non-volatile computer-readable memory devices. It can also include computer storage media (described below). Memory 21 stores computer readable instructions that, when executed by processor 17, cause the processor to perform computer-implemented steps or functions according to the instructions. Items in data store 134, for example, can reside in memory 21. Similarly, device 16 can have a client system 24 which can run various business applications. Processor 17 can be activated by other components to facilitate their functionality as well.

Examples of the network settings 31 include things such as proxy information, Internet connection information, and mappings. Application configuration settings 35 include settings that tailor the application for a specific enterprise or user. Communication configuration settings 41 provide parameters for communicating with other computers and include items such as GPRS parameters, SMS parameters, connection user names and passwords.

Applications 33 can be applications that have previously been stored on the device 16 or applications that are installed during use, although these can be part of operating system 29, or hosted external to device 16, as well.

FIG. 14 shows one example in which device 16 is a tablet computer 850. In FIG. 14, computer 850 is shown with user interface display displayed on the display screen 852. Screen 852 can be a touch screen (so touch gestures from a user's finger can be used to interact with the application) or a pen-enabled interface that receives inputs from a pen or stylus. It can also use an on-screen virtual keyboard. Of course, it might also be attached to a keyboard or other user input device through a suitable attachment mechanism, such as a wireless link or USB port, for instance. Computer 850 can also illustratively receive voice inputs as well.

Additional examples of device 16 can be used, as well. Device 16 can be a feature phone, smart phone or mobile phone. The phone includes a set of keypads for dialing phone numbers, a display capable of displaying images including application images, icons, web pages, photographs, and video, and control buttons for selecting items shown on the display. The phone includes an antenna for receiving cellular phone signals such as General Packet Radio Service (GPRS) and 1×rtt, and Short Message Service (SMS) signals. In some examples, phone also includes a Secure Digital (SD) card slot that accepts a SD card.

The mobile device can be personal digital assistant (PDA) or a multimedia player or a tablet computing device, etc. (hereinafter referred to as a PDA). The PDA can include an inductive screen that senses the position of a stylus (or other pointers, such as a user's finger) when the stylus is positioned over the screen. This allows the user to select, highlight, and move items on the screen as well as draw and write. The PDA also includes a number of user input keys or buttons which allow the user to scroll through menu options or other display options which are displayed on the display, and allow the user to change applications or select user input functions, without contacting the display. Although not shown, The PDA can include an internal antenna and an infrared transmitter/receiver that allow for wireless communication with other computers as well as connection ports that allow for hardware connections to other computing devices. Such hardware connections are typically made through a cradle that connects to the other computer through a serial or USB port. As such, these connections are non-network connections. In one example, mobile device also includes a SD card slot that accepts a SD card.

FIG. 15 shows that the phone is a smart phone 71. Smart phone 71 has a touch sensitive display 73 that displays icons or tiles or other user input mechanisms 75. Mechanisms 75 can be used by a user to run applications, make calls, perform data transfer operations, etc. In general, smart phone 71 is built on a mobile operating system and offers more advanced computing capability and connectivity than a feature phone.

Note that other forms of the device 16 are possible.

Figure 16:
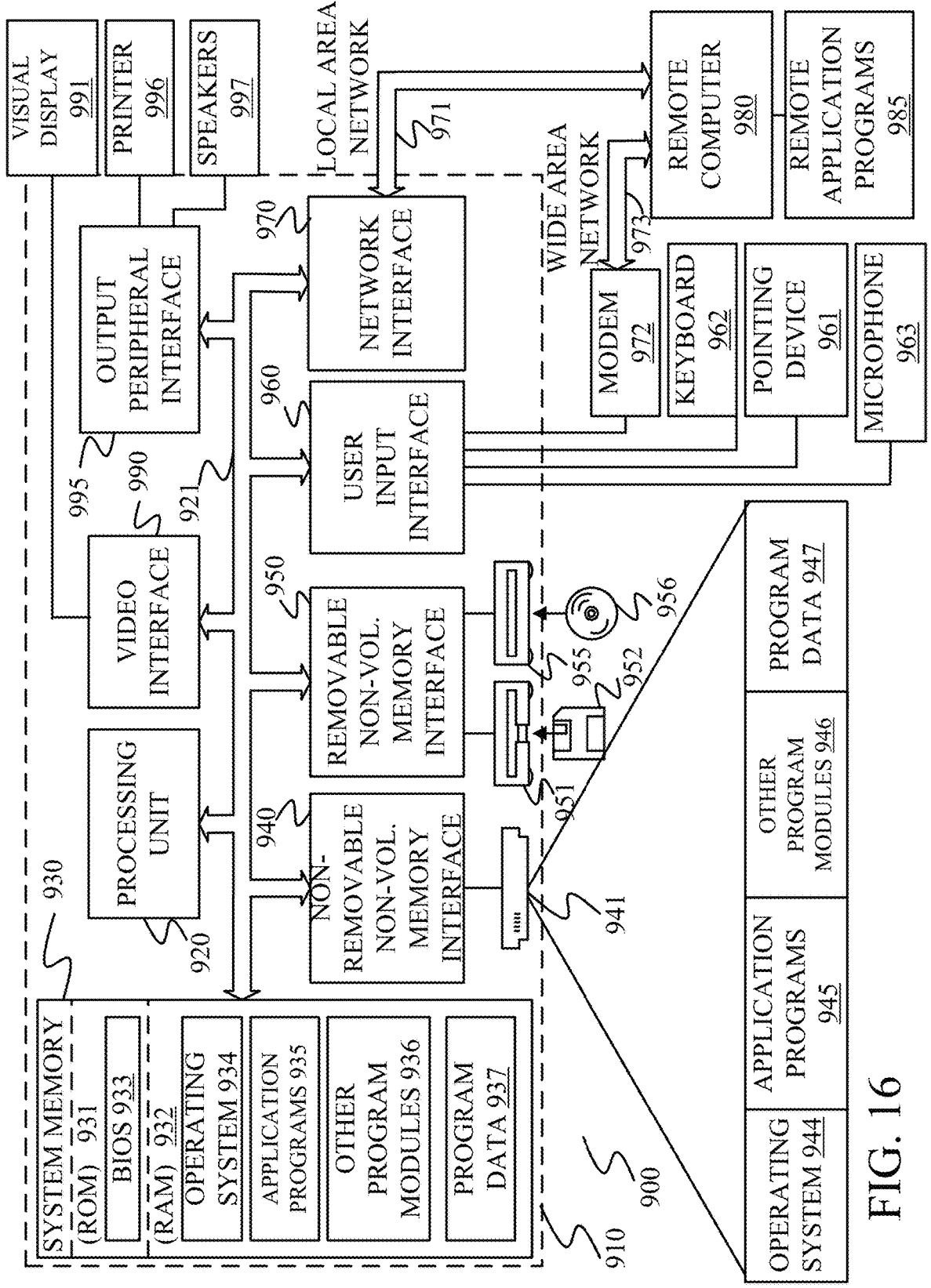
FIG. 16 is a block diagram of one example of a computing environment that can be used in various parts of the architectures set out in the previous figures.

FIG. 16 is one example of a computing environment in which architecture 100, or parts of (for example) can be deployed. With reference to FIG. 16, an exemplary system 900 for implementing some examples includes a general-purpose computing device in the form of a computer 910. Components of computer 910 may include, but are not limited to, a processing unit 920, a system memory 930, and a system bus 921 that couples various system components including the system memory to the processing unit 920. The system bus 921 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus. Memory and programs described with respect to FIG. 1 can be deployed in corresponding portions of FIG. 16.

Computer 910 typically includes a variety of computer readable media. Computer readable media can be any available media that can be accessed by computer 910 and includes both volatile and nonvolatile media, removable and non-removable media. By way of example, and not limitation, computer readable media may comprise computer storage media and communication media. Computer storage media is different from, and does not include, a modulated data signal or carrier wave. It includes hardware storage media including both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computer 910. Communication media typically embodies computer readable instructions, data structures, program modules or other data in a transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer readable media.

The system memory 930 includes computer storage media in the form of volatile and/or nonvolatile memory such as read only memory (ROM) 931 and random access memory (RAM) 932. A basic input/output system 933 (BIOS), containing the basic routines that help to transfer information between elements within computer 910, such as during start-up, is typically stored in ROM 931. RAM 932 typically contains data and/or program modules that are immediately accessible to and/or presently being operated on by processing unit 920. By way of example, and not limitation, FIG. 16 illustrates operating system 934, application programs 935, other program modules 936, and program data 937.

The computer 910 may also include other removable/non-removable volatile/nonvolatile computer storage media. By way of example only, FIG. 16 illustrates a hard disk drive 941 that reads from or writes to non-removable, nonvolatile magnetic media, a magnetic disk drive 951 that reads from or writes to a removable, nonvolatile magnetic disk 952, and an optical disk drive 955 that reads from or writes to a removable, nonvolatile optical disk 956 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 941 is typically connected to the system bus 921 through a non-removable memory interface such as interface 940, and magnetic disk drive 951 and optical disk drive 955 are typically connected to the system bus 921 by a removable memory interface, such as interface 950.

Alternatively, or in addition, the functionality described herein can be performed, at least in part, by one or more hardware logic components. For example, and without limitation, illustrative types of hardware logic components that can be used include Field-programmable Gate Arrays (FPGAs), Program-specific Integrated Circuits (ASICs), Program-specific Standard Products (ASSPs), System-on-a-chip systems (SOCs), Complex Programmable Logic Devices (CPLDs), etc.

The drives and their associated computer storage media discussed above and illustrated in FIG. 16, provide storage of computer readable instructions, data structures, program modules and other data for the computer 910. In FIG. 16, for example, hard disk drive 941 is illustrated as storing operating system 944, application programs 945, other program modules 946, and program data 947. Note that these components can either be the same as or different from operating system 934, application programs 935, other program modules 936, and program data 937. Operating system 944, application programs 945, other program modules 946, and program data 947 are given different numbers here to illustrate that, at a minimum, they are different copies.

A user may enter commands and information into the computer 910 through input devices such as a keyboard 962, a microphone 963, and a pointing device 961, such as a mouse, trackball or touch pad. Other input devices (not shown) may include a joystick, game pad, satellite dish, scanner, or the like. These and other input devices are often connected to the processing unit 920 through a user input interface 960 that is coupled to the system bus, but may be connected by other interface and bus structures, such as a parallel port, game port or a universal serial bus (USB). A visual display 991 or other type of display device is also connected to the system bus 921 via an interface, such as a video interface 990. In addition to the monitor, computers may also include other peripheral output devices such as speakers 997 and printer 996, which may be connected through an output peripheral interface 995.

The computer 910 is operated in a networked environment using logical connections to one or more remote computers, such as a remote computer 980. The remote computer 880 may be a personal computer, a hand-held device, a server, a router, a network PC, a peer device or other common network node, and typically includes many or all of the elements described above relative to the computer 910. The logical connections depicted in FIG. 16 include a local area network (LAN) 971 and a wide area network (WAN) 973, but may also include other networks. Such networking environments are commonplace in offices, enterprise-wide computer networks, intranets and the Internet.

When used in a LAN networking environment, the computer 910 is connected to the LAN 971 through a network interface or adapter 970. When used in a WAN networking environment, the computer 910 typically includes a modem 972 or other means for establishing communications over the WAN 973, such as the Internet. The modem 972, which may be internal or external, may be connected to the system bus 921 via the user input interface 960, or other appropriate mechanism. In a networked environment, program modules depicted relative to the computer 910, or portions thereof, may be stored in the remote memory storage device. By way of example, and not limitation, FIG. 16 illustrates remote application programs 985 as residing on remote computer 980. It will be appreciated that the network connections shown are exemplary and other means of establishing a communications link between the computers may be used.

It should also be noted that the different embodiments described herein can be combined in different ways. That is, parts of one or more embodiments can be combined with parts of one or more other embodiments. All of this is contemplated herein.

Example 1 is a computing system comprising a display system, a portal hierarchy model have a plurality of nodes arranged in hierarchical parent/child relationships, each node representing a set of one or more portals and having associated portal configuration data, and a portal rendering system configured to detect a user request to render content in a given one of the portals and to obtain a set of portal configuration data for the given portal by identifying a first node in the portal hierarchy model that represents the given portal and traversing the portal hierarchy model from the first node to a second node that is a parent of the first node. The computing system also includes a display system controller configured to control the display system to generate portal user interface displays based on the set of portal configuration data.

Example 2 is the computing system of any or all previous examples, wherein the first node comprises a leaf node in the portal hierarchy model.

Example 3 is the computing system of any or all previous examples, wherein the portal hierarchy model comprises a plurality of leaf nodes each representing a different portal.

Example 4 is the computing system of any or all previous examples, wherein the second node represents a plurality of different portals, including the given portal, and includes portal configuration data for the plurality of different portals.

Example 5 is the computing system of any or all previous examples, wherein the portal configuration data for each node comprises language translation data that define textual translations into one or more languages.

Example 6 is the computing system of any or all previous examples, wherein the portal configuration data for at least one of the nodes includes text strings in a plurality of different languages.

Example 7 is the computing system of any or all previous examples, wherein the portal rendering system is configured to identify a language in which to render the content in the given portal and to traverse the portal hierarchy model based on the identified language.

Example 8 is the computing system of any or all previous examples, wherein the set of portal configuration data defines how the given portal is translated into the identified language.

Example 9 is the computing system of any or all previous examples, wherein the user request to render content comprises a request to render, in a given language, a user interface display having at least one user interface element, and the set of portal configuration data defines a text string for the user interface element.

Example 10 is the computing system of any or all previous examples, wherein the portal rendering system is configured to determine whether a text string in the given language is defined at the first node and, if not, traverse the portal hierarchy model to determine whether a text string in the given language is defined at the second node.

Example 11 is the computing system of any or all previous examples, wherein the portal rendering system is configured to traverse the portal hierarchy model from the second node to a third node, that is a parent of the second node, if a text string in the given language is not defined at the second node.

Example 12 is the computing system of any or all previous examples, wherein the portal rendering system is configured to determine that a text string in the given language is not defined in the portal hierarchy model and, in response, select the text string for the user interface element that is in a default language, that is different than the given language.

Example 13 is the computing system of any or all previous examples, wherein the user request to render content comprises a request to render a plurality of user interface elements, and the set of portal configuration data comprises text strings for each of the user interface elements.

Example 14 is the computing system of any or all previous examples, wherein the portal rendering system is configured to obtain the text strings for the plurality of user interface elements by, for each user interface element, analyzing the first node in the portal hierarchy model to determine whether a text string is defined for the user interface element and to traverse the portal hierarchy model to the second node if the text string is not defined.

Example 15 is the computing system of any or all previous examples, wherein each user interface element comprises a unique identifier that uniquely identifies the user interface element within the computing system, and wherein the set of portal configuration data associates the text strings with the unique identifiers.

Example 16 is a computer-implemented method comprising generating a user interface display with user input mechanisms, detecting user interaction with the user input mechanisms that requests content in a given portal, accessing a portal hierarchy model that includes a plurality of nodes arranged in hierarchical parent/child relationships, each node representing a set of one or more portals and having associated portal configuration data, obtaining a set of portal configuration data for the given portal by identifying a first node in the portal hierarchy model that represents the given portal and traversing the portal hierarchy model from the first node to a second node that is a parent of the first node, and generating a portal user interface display based on the set of portal configuration data.

Example 17 is the computer-implemented method of any or all previous examples, and further comprising identifying a selected language in which to render the content in the given portal, wherein the portal hierarchy model is traversed, based on the selected language, to obtain the set of portal configuration data for rendering the content in the selected language.

Example 18 is the computer-implemented method of any or all previous examples, wherein identifying a selected language comprises detecting a user input that selects the selected language from a plurality of available languages.

Example 19 is the computer-implemented method of any or all previous examples, and further comprising identifying the plurality of available languages by traversing the portal hierarchy model to identify languages assigned to nodes in the portal hierarchy model.

Example 20 is a computing system comprising a display system, a provisioning system configured to generate a portal hierarchy model that includes a plurality of nodes arranged in hierarchical parent/child relationships, each node representing a set of one or more portals, and a configuration system comprising a display system controller configured to control the display system to generate a portal configuration user interface display with user input mechanisms and to detect user interaction with the user input mechanisms that define portal customizations for a given portal, wherein the configuration system includes a portal customization component that is configured to customize the given portal by generating port configuration data that is stored in association with a node in the portal hierarchy model that represents the given portal.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims and other equivalent features and acts are intended to be within the scope of the claims.

What is claimed is:

1. A computing system comprising:
a processor; and
memory storing instructions executable by the processor, wherein the instructions, when executed, configure the computing system to:
receive a request to access a selected portal of a plurality of portals associated with the computing system, wherein each portal includes a respective set of user interface displays and the request includes a portal identifier that identifies the selected portal;
access a portal hierarchy model comprising a plurality of nodes arranged in hierarchical parent/child relationships, wherein each node corresponds to at least one portal and comprises a data object that stores portal configuration data which comprises user interface rendering data for rendering user interface elements in at least one of the portals represented by the node;
retrieve the portal identifier included in the request;
based on the retrieved portal identifier, identify a first node in the portal hierarchy model that represents the selected portal, the first node comprising a first data object storing:
first portal configuration data defining text strings for rendering a first set of user interface elements in the selected portal; and
a parent portal attribute that identifies a second node that is hierarchically-related as a parent node to the first node in the portal hierarchy model;
retrieve the parent portal attribute from the first data object;
based on the retrieved parent portal attribute, traverse the portal hierarchy model to access a second data object that is associated with the second node and stores second portal configuration data defining text strings for rendering a second set of user interface elements in the selected portal, wherein the second set of user interface elements are different from the first set of user interface elements; and
generate a user interface display, in the selected portal, that includes the first and second sets of user interface elements generated based on the first and second portal configuration data.

2. The computing system of claim 1, wherein the first set of user interface elements comprises a user input mechanism.

3. The computing system of claim 2, wherein the portal hierarchy model comprises a plurality of leaf nodes including the first node, each leaf node representing a different portal.

4. The computing system of claim 1, wherein
the second data object represents a plurality of different portals, and
the second portal configuration data defines a rendering for the second set of user interface elements in the plurality of different portals.

5. The computing system of claim 1, wherein the portal configuration data for each node comprises language translation data that define textual translations into one or more languages.

6. The computing system of claim 5, wherein the portal configuration data for at least one of the nodes includes text strings in a plurality of different languages.

7. The computing system of claim 1, wherein the instructions configure the computing system to identify a language in which to render the user interface content in the particular portal and to traverse the portal hierarchy model based on the identified language.

8. The computing system of claim 7, wherein the second portal configuration data defines a translation of user interface content in the particular portal into the identified language.

9. The computing system of claim 1, wherein the portal access request comprises language information that identifies a particular language in which to render the user interface display in the selected portal, and the first and second portal configuration data defines text strings for user interface elements in the particular language.

10. The computing system of claim 9, wherein the text strings are associated with the user interface elements, and the instructions configure the computing system to:
   determine whether a particular one of the text strings in the particular language is defined by the first portal configuration data stored in the first data object, and
   based on a determination that the text string is not defined by the first portal configuration data, traverse the portal hierarchy model using the parent portal attribute to determine whether the particular text string in the particular language is defined by the second portal configuration data stored by the second data object.

11. The computing system of claim 10, wherein the instructions configure the computing system to traverse the portal hierarchy model from the second node to a third node, that is a parent of the second node, if the text string in the particular language is not defined by the second portal configuration data stored by the second data object.

12. The computing system of claim 9, wherein the instructions configure the computing system to determine that the text string in the particular language is not defined in the portal hierarchy model and, in response, select the text string for the user interface element that is in a default language, that is different than the particular language.

13. The computing system of claim 1, wherein the instructions configure the computing system to:
   obtain a unique identifier that uniquely identifies a particular user interface element;
   based on a determination that the first portal configuration data does not associate the unique identifier with a text string definition, traverse the portal hierarchy model to the second node; and
   obtain mapping information that is stored in the second data object and maps the unique identifier to a text string definition that defines a text string for the particular user interface element.

14. The computing system of claim 13, wherein the portal access request comprises a request to render a plurality of user interface elements, and the instructions configure the computing system to obtain text strings for each of the plurality of user interface elements by:
   for each particular one of the user interface elements,
      analyzing the first data object to determine whether a text string is defined for the particular user interface element;
      traversing the portal hierarchy model to the second node if a text string is not defined for the particular user interface element; and
      analyzing the second data object to determine whether a text string is defined for the particular user interface element.

15. The computing system of claim 14, wherein each user interface element comprises a unique identifier that uniquely identifies the user interface element within the computing system, and wherein the second portal configuration data maps the unique identifiers to language-specific text string customizations.

16. A computer-implemented method comprising:
   receiving a request to access a particular portal of a plurality of portals associated with a computing system, wherein each portal includes a respective set of user interface displays and the request includes a portal identifier that identifies the particular portal;
   accessing a portal hierarchy model that includes a plurality of nodes arranged in hierarchical parent/child relationships, wherein each node corresponds to at least one portals and comprises a data object that stores portal configuration data which comprises user interface rendering data for rendering user interface elements in at least one portal represented by the node;
   retrieving the portal identifier included in the request;
   based on the retrieved portal identifier, identifying a first node in the portal hierarchy model that represents the particular portal, the first node comprising a first data object storing:
      first portal configuration data defining textual strings for rendering a first set of user interface elements in the particular portal; and
      a parent portal attribute that identifies a second node that is hierarchically-related as a parent node to the first node in the portal hierarchy model;
   retrieving the parent portal attribute from the first data object;
   based on the retrieved parent portal attribute, traversing the portal hierarchy model to access a second data object that is associated with the second node and stores second portal configuration data defining text strings for rendering a second set of user interface elements in the particular portal, wherein the second set of user interface elements are different from the first set of user interface elements; and
   generating a user interface display, in the particular portal, that includes the first and second sets of user interface elements generated based on the first and second portal configuration data.

17. The computer-implemented method of claim 16, and further comprising:
   based on the portal access request, identifying a selected language in which to render the user interface display, wherein the portal hierarchy model is traversed, based on the selected language, to obtain portal configuration data for rendering the user interface display in the selected language.

18. The computer-implemented method of claim 17, wherein identifying a selected language comprises detecting a user input that selects the selected language from a plurality of available languages.

19. The computer-implemented method of claim 18, and further comprising:
   identifying the plurality of available languages by traversing the portal hierarchy model to identify languages assigned to nodes in the portal hierarchy model.

* * * * *